(12) United States Patent
Mitnick

(10) Patent No.: US 8,880,583 B2
(45) Date of Patent: Nov. 4, 2014

(54) SYSTEM AND METHOD FOR PERMITTING GEOGRAPHICALLY-PERTINENT INFORMATION TO BE RANKED BY USERS ACCORDING TO USERS' GEOGRAPHIC PROXIMITY TO INFORMATION AND TO EACH OTHER FOR AFFECTING THE RANKING OF SUCH INFORMATION

(75) Inventor: Craig R. Mitnick, Voorhees, NJ (US)

(73) Assignee: Nixle, LLC, San Francisco, CA (US)

( * ) Notice: Subject to any disclaimer, the term of this patent is extended or adjusted under 35 U.S.C. 154(b) by 1548 days.

(21) Appl. No.: 11/933,818

(22) Filed: Nov. 1, 2007

(65) Prior Publication Data

US 2008/0307053 A1 Dec. 11, 2008

Related U.S. Application Data

(60) Provisional application No. 60/942,841, filed on Jun. 8, 2007, provisional application No. 60/944,145, filed on Jun. 15, 2007, provisional application No. 60/969,811, filed on Sep. 4, 2007.

(51) Int. Cl.
*G06F 15/16* (2006.01)
*G06F 17/30* (2006.01)

(52) U.S. Cl.
CPC ............................ *G06F 17/30241* (2013.01)
USPC ....................................................... 709/203

(58) Field of Classification Search
USPC ....................................................... 709/203
See application file for complete search history.

(56) References Cited

U.S. PATENT DOCUMENTS

| | | | |
|---|---|---|---|
| 5,930,474 A | 7/1999 | Dunworth et al. | |
| 6,006,218 A * | 12/1999 | Breese et al. | 707/3 |
| 6,014,654 A * | 1/2000 | Ariyoshi | 706/62 |
| 6,041,311 A * | 3/2000 | Chislenko et al. | 705/27 |
| 6,460,036 B1 | 10/2002 | Herz | |
| 6,792,573 B1 | 9/2004 | Duncombe | |
| 6,981,040 B1 | 12/2005 | Konig et al. | |
| 6,985,588 B1 | 1/2006 | Glick et al. | |
| 7,013,238 B1 | 3/2006 | Weare | |
| 7,071,842 B1 | 7/2006 | Brady, Jr. | |
| 7,080,064 B2 | 7/2006 | Sundaresan | |
| 7,231,405 B2 | 6/2007 | Xia | |
| 7,606,581 B2 * | 10/2009 | Riise et al. | 455/456.1 |
| 7,610,051 B2 * | 10/2009 | Dunko et al. | 455/456.1 |
| 8,442,969 B2 * | 5/2013 | Gross | 707/709 |

(Continued)

FOREIGN PATENT DOCUMENTS

GB 2448136 A * 10/2008
WO 00/52934 9/2000

OTHER PUBLICATIONS

Ding, Gravano, and Shivakumar, "Computing Geographical Scopes of Web Resource," 2000.*

(Continued)

*Primary Examiner* — Andrew Georgandellis
(74) *Attorney, Agent, or Firm* — Caesar, Rivise, Bernstein, Cohen & Pokotilow, Ltd.

(57) ABSTRACT

A system and method for permitting geographically-pertinent information provided on the Internet to be ranked by users, while taking into account the users' geographic proximity to the information, the distance between each user who rates the information, the age of the information, and the age of the users' ratings to determine a ranking for affecting the ranking of information.

13 Claims, 24 Drawing Sheets

(56) References Cited

U.S. PATENT DOCUMENTS

| | | | |
|---|---|---|---|
| 8,473,335 B2* | 6/2013 | Deeming et al. | 705/14.26 |
| 2002/0120629 A1* | 8/2002 | Leonard | 707/100 |
| 2003/0061211 A1* | 3/2003 | Shultz et al. | 707/3 |
| 2005/0004948 A1 | 1/2005 | Navar et al. | |
| 2005/0065916 A1* | 3/2005 | Ge et al. | 707/3 |
| 2005/0080786 A1* | 4/2005 | Fish et al. | 707/10 |
| 2005/0278309 A1 | 12/2005 | Evans et al. | |
| 2006/0004713 A1 | 1/2006 | Korte et al. | |
| 2006/0046696 A1* | 3/2006 | Knowles et al. | 455/412.1 |
| 2006/0085392 A1 | 4/2006 | Wang et al. | |
| 2006/0123012 A1* | 6/2006 | Barth | 707/10 |
| 2006/0149774 A1* | 7/2006 | Egnor | 707/102 |
| 2006/0200490 A1 | 9/2006 | Abbiss | |
| 2006/0218146 A1 | 9/2006 | Bitan et al. | |
| 2006/0266830 A1* | 11/2006 | Horozov et al. | 235/386 |
| 2006/0271281 A1 | 11/2006 | Ahn et al. | |
| 2006/0271531 A1 | 11/2006 | O'Clair et al. | |
| 2007/0005419 A1* | 1/2007 | Horvitz et al. | 705/14 |
| 2007/0032942 A1 | 2/2007 | Thota | |
| 2007/0047568 A1 | 3/2007 | Wang et al. | |
| 2007/0061301 A1 | 3/2007 | Ramer et al. | |
| 2007/0061302 A1* | 3/2007 | Ramer et al. | 707/3 |
| 2007/0100955 A1 | 5/2007 | Bodner | |
| 2007/0118430 A1 | 5/2007 | Wiseman et al. | |
| 2007/0118520 A1 | 5/2007 | Bliss et al. | |
| 2007/0150199 A1* | 6/2007 | Riise et al. | 702/5 |
| 2007/0156435 A1 | 7/2007 | Greening et al. | |
| 2008/0010258 A1* | 1/2008 | Sureka | 707/3 |
| 2008/0172374 A1* | 7/2008 | Wolosin et al. | 707/5 |
| 2008/0243821 A1* | 10/2008 | Delli Santi et al. | 707/5 |
| 2008/0270375 A1* | 10/2008 | Nanduri et al. | 707/5 |
| 2009/0037566 A1* | 2/2009 | Hoile et al. | 709/223 |

OTHER PUBLICATIONS

Buyukkokten, Cho, and Garcia-Molina, "Exploiting Geographical Location Information of Web Pages."*
Brunato and Battiti, "Pilgrim: A Location Broker and Mobility-Aware Recommendation System," 2002.*
Yelp, Yelp.com, Jan. 1, 2004.*
Abou-Assaleh, Geographic Ranking . . . , ACM SIGIR, Jul. 23, 2007.*
Larson, Geographic Information Retrieval . . . , JCDL Jun. 7, 2004.*
Van Kreveld, Multi-Dimensional Scattered . . . , Geoinformatica, Nov. 15, 2004.*
International Search Report for corresponding PCT Application No. PCT/US2008/064533, dated Nov. 19, 2008.
John Breese, David Heckerman, and Carl Kadie. Empirical analysis of predictive algorithms for collaborative filtering. Technical Report MSR-TR-98-12, Microsoft Research, 1998.
Jennifer Golbeck. Computing and Applying Trust in Web-Based Social Networks. PhD thesis. University of Maryland, College Park, 2005.
Jennifer Golbeck. Generating predictive movie recommendations from trust in social networks. In Proc. of the 4th International Conference on Trust Management (iTrust), 2006.
Jennifer Golbeck. Personalizing applications through integration of inferred trust values in semantic web-based social networks. In Proc. of the Semantic Network Analysis Workshop, 2005.
Ken Goldberg, Theresa Roeder, Dhruv Gupta and Chris Perkins. Eigentaste: A constant time collaborative filtering algorithm. Information Retrieval, 4:133-151, 2001.
G. Linden, B. Smith, and J. York. Amazon.com recommendations: Item-to-item collaborative filtering. IEEE Internet Computing, 7(1):76-80, Jan./Feb. 2003.
Stephen Marsh. Formalising Trust as a Computational Concept. PhD thesis, University of Stirling, 1994.
Andreas Mild and Thomas Reutterer. An improved collaborative filtering approach for predicting cross-category purchases based on binary market data. Journal of Retailing and Consumer Services Special Issue on Model Building in Retailing and Consumer Service, Oct. 2002.
Liliana Ardissono, Luca Console, and IlariaTorre. An adaptive system for the personalized access to news. AI Communications, 14(3):129-147, 2001.
Orkut Buyukkokten, Junghoo Cho, Hector Garcia-Molina, Luis Gravano, and Narayanan Shivakumar. Exploiting geographical location information of web pages. In WebDB (Informal Proceedings), pp. 91-96, 1999.
Abhinandan Das, Mayur Datar, and Ashutosh Garg. Google news personalization: Scalable online collaborative filtering. In Proc. of WWW 2007, 2007.
Junyan Ding, Luis Gravano, and Narayanan Shivakumar. Computing geographical scopes of web resources. In Proc. of the 26th VLDB Conference, 2000.
Raymond Mooney. Content-based book recommending using learning for text categorization. In Proc. of the 5th ACM Conference on Digital Libraries, Jun. 2002.
Shopping.com, Inc., www.shopping.com.
Andrew Trotman, Timothy Jones, and Chris Handley. Recommending geocaches. In Proc. of the 10th Australasian Document Computing Symposium, Dec. 2005.
Mauro Brunato and Roberto Battiti. PILGRIM: A location broker and mobility-aware recommendation system. In Proc. of the First IEEE International Conference on Pervasive Computing and Communications, 2003.
Mauro Brunato, Roberto Battiti, Alessandro Villani, and Andrea Delai. A location-dependent recommender system for the web. Technical Report DIT-02-0095, Universitá di Trento, Nov. 2002.
Wesley Chan. Dealfinder: A collaborative, location-aware mobile shopping application.
Andrew Fano. Shopper's eye: Using location-based filtering for a shopping agent in the physical world. In Proc. of the Second International Conference on Autonomous Agent, pp. 46-421, May 1998.
Google, Inc. Google local. http://local.google.com.
Groundspeak, Inc. Geocaching—the official global gps cache hunt site. http://www.geocaching.com.
T. Gross and M. Specht. Awareness in context-aware information systems. In Proc. Mensch Computer 2001, 2001.
Kevin Keenoy and Mark Levene. Personalisation of web search. Intelligent Techniques for Web Personalization, pp. 201-228, 2005.
Mehran Nadjarbashi-Noghani, Jie Zhang, Hossein Sadat K.M., and Ali Ghorbani. PENS: A personalized electronic news source. In Proc. of the 3rdAnnual Communication Networks and Services Conference, 2005.
Topix, LLC. Topix, 2007. http://www.topix.net.
Chin-ShungYang, Szu-Pyng Kao, Fen-Bin Lee, and Pen-Shan Hung. Twelve different interpolation methods: A case study of surfer 8.0 In Proc. of the XXth ISPRS Congress, Geo-Imagery Bridging Continents, Jul. 2004.
Yelp. Yelp.com. http:/www.yelp.com.
Joshua Alspector, Aleksander Kolcz, and Nachimuthu Karunanithi. Comparing feature-based and clique-based user models for movie selection. In Proc. of Digital Libraries 1998, 1998.
Marko Balabanović. An adaptive web page recommendation service. In Proc. of the 1st International Conference on Autonomous Agents, Feb. 1997.
Dhiraj Goel and Dhruv Batra. Predicting user preference for movies using netflix database. Student class project report.
Joseph Konstan, Bradley Miller, David Maltz, Jonathan Herlocker, Lee Gordon and John Riedl. Grouplens: Applying collaborative filtering to usenet news. Communications of the ACM, 40(3), Mar. 1997.
H.J. Lee and Sung Joo Park. Moners: A news recommender for the mobile web. Expert Systems with Applications, 32:143-150, 2007.
Steffen Schilke, Udo Bleimann, Steven Furnell, and Andrew Phippen. Multi-dimensional personalization for location and interest-based recommendation. Internet Research, 14(5):379-385, 2004.
M. van Setten. Personalised information systems. Technical Report TI/RS/2001/036, Telematica Instituut, Jun. 2001.
Joseph A. Konstan. Introduction to recommender systems: Algorithms and evaluation. ACM Trans. Inf. Syst., 22(1):1-4, 2004.

* cited by examiner

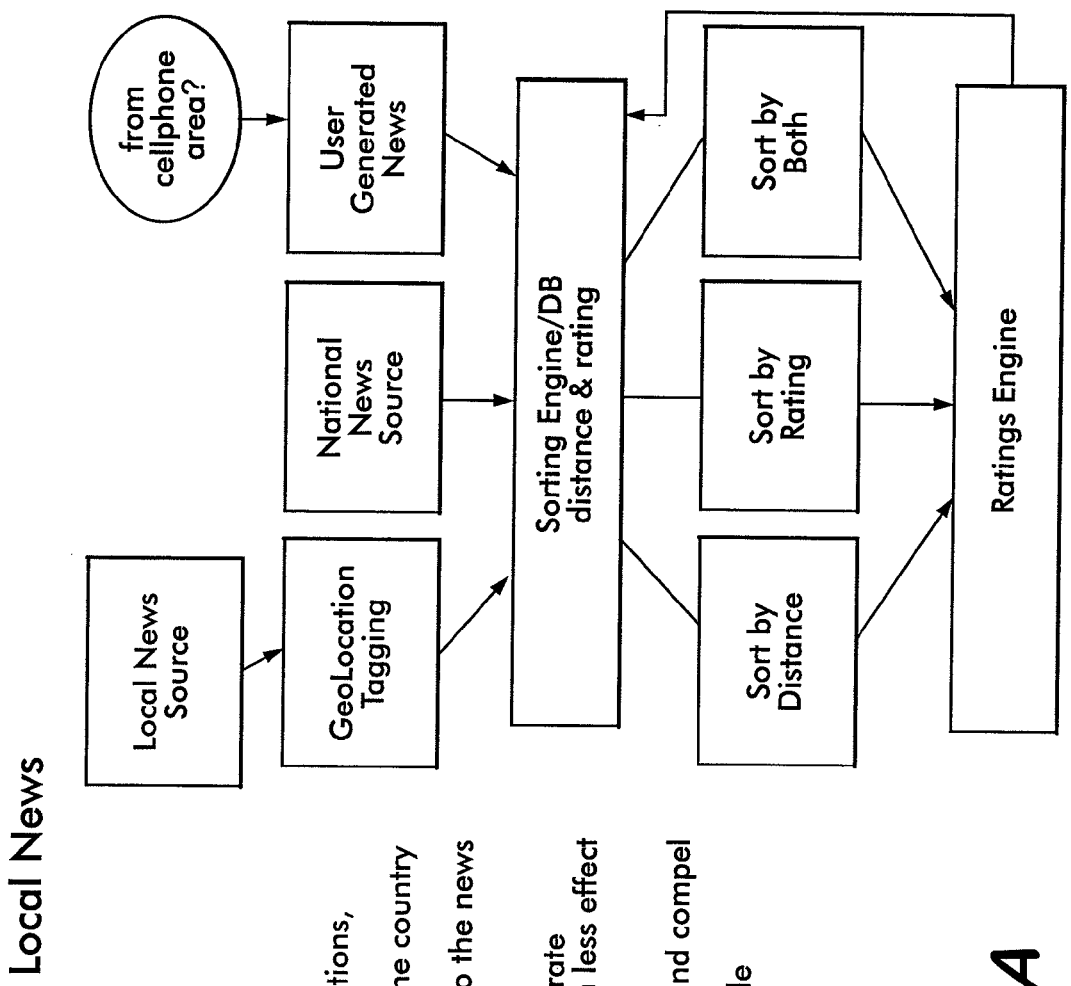

Local News

* News feed
  * Aggregates data from news feeds
  * Local news from local news sources
  * News from national sources like AP with geolocation data
  * Sorts news by closest location and highest rating
    * Default view - Local News - News closer to you at the top
    * Top Stories - Highest rated news from other locations, closest first
    * Top National Stories - Highest rated news across the country
  * News rating
    * Takes in-effect the location of the rater relative to the news to determine it's national rating
    * Rating has protection to prevent "gaming"
    * User's login is remembered to make it easier to rate
    * Ratings allowed by non-registered users but with less effect on the overall rating
    * Limited by IP
  * Takes advantage of user psychology to capture and compel their attention
  * Capture and use indirect information they provide (clickstream, etc.)
  * On-demand video
  * Flash based
  * Server replicated
  * P2P replicated
  * Java applet in webpage

FIG.2A

Mobile Exchange

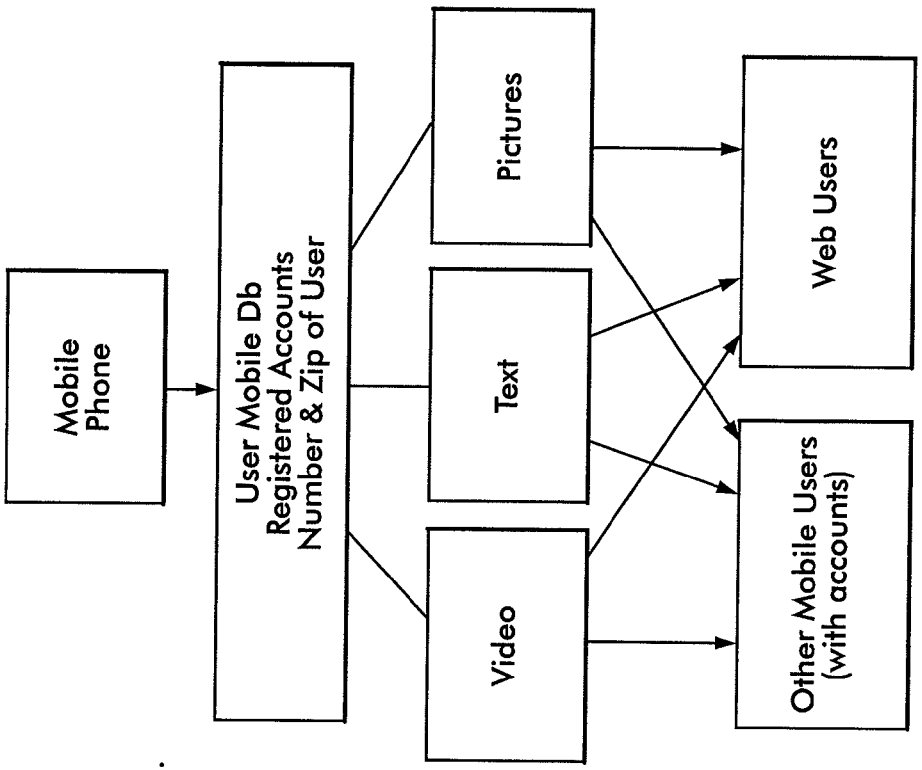

* Mobile phone exchange
  * Submissions can be sent to username at a specified email address
    * User is given a special email address that links to their account.
    * User's cell number is registered to an account, caller ID information is used to link the user's submission to the account
    * Messages are sent to a specified zipcode email address
  * Data comes in from cellphones
  * Reduce user's cost
    * Video
    * MMS
    * Email
    * Text
    * SMS
    * Email
    * Shortcode
    * Pictures
  * Location Information
    * Location is determined by GPS data from phones
    * Java applet to read GPS
    * Location is sent in the submission, we scan for anything that looks like a street corner, zipcode, city/state, etc. in the message body
  * Share content with friends
    * email invites
    * friends list
    * Find people with similar interests

FIG.2B

Collect News Site Metadata
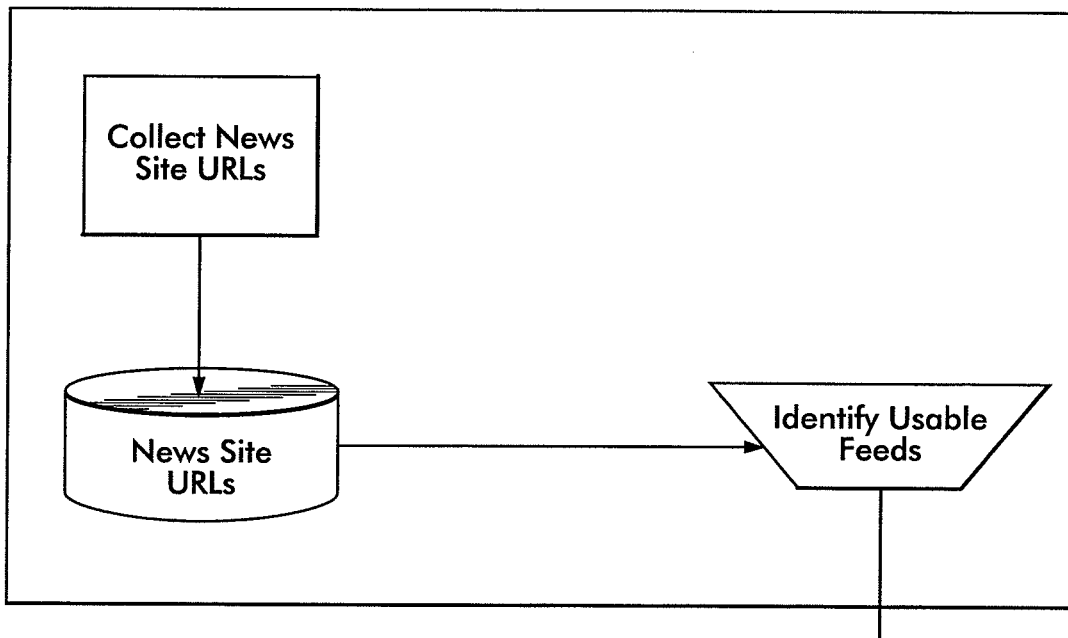
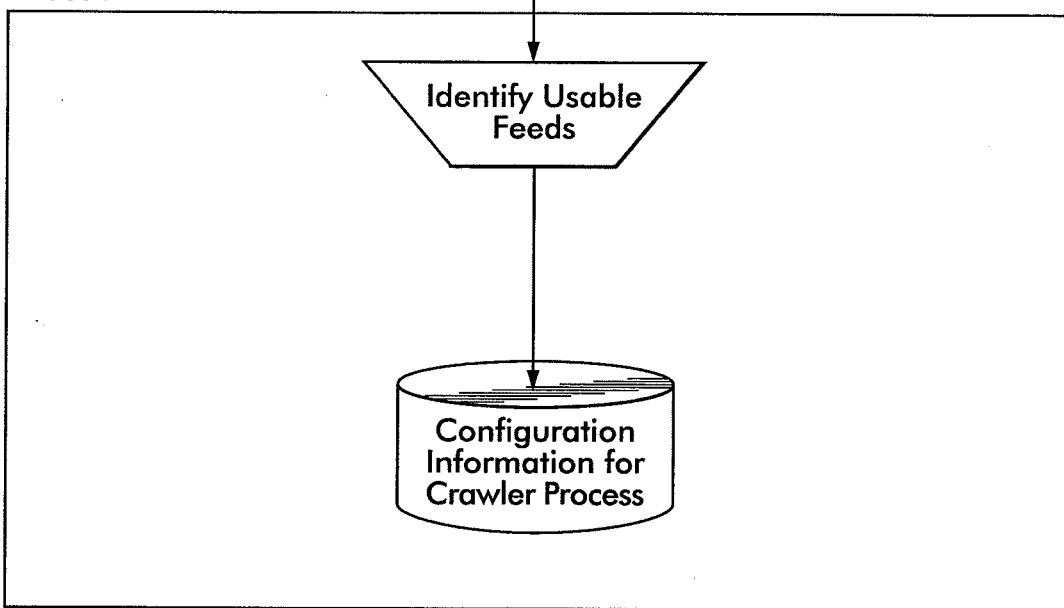
*FIG.4*

Upload Videos and Photos

Headline: [　　　　　　　]

Article Body:
[　　　　　　　　　　　　　]

Choose file(s) to upload:

File 1: [　　　　　　　] (Browse)
File 2: [　　　　　　　] (Browse)
File 3: [　　　　　　　] (Browse)
File 4: [　　　　　　　] (Browse)
File 5: [　　　　　　　] (Browse)

Category: [　　　　　　▼]

Where was this media captured?
[78704]

*Pre-fill from user's profile. Be lenient in formats accepted*

Assign tags to article:
[　　　　　　　　　]

(Upload)

News and Information Exchange
for Corvallis, OR 97330 *change location*

[            ] (Search)

Local News

Flanhunt 6/20/2007
Authorities believe suspect is in vicinity.
Authorities believe suspect is in vicinity.

Flanhunt 6/20/2007
Authorities believe suspect is in vicinity.
Authorities believe suspect is in vicinity.

Flanhunt 6/20/2007
Authorities believe suspect is in vicinity.
Authorities believe suspect is in vicinity.

Flanhunt 6/20/2007
Authorities believe suspect is in vicinity.
Authorities believe suspect is in vicinity.

Flanhunt 6/20/2007
Authorities believe suspect is in vicinity.
Authorities believe suspect is in vicinity.

Flanhunt 6/20/2007
Authorities believe suspect is in vicinity.
Authorities believe suspect is in vicinity.

National News

Manhunt  6/20/2007
WASHINGTON - The CIA offered 150,000 dollars to Mafia figures to kill Cuban leader Fidel Castro, just one of several CIA plots against foreign leaders detailed in 693 pages of classified US documents released Tuesday.

Manhunt  6/20/2007
WASHINGTON - The CIA offered 150,000 dollars to Mafia figures to kill Cuban leader Fidel Castro, just one of several CIA plots against foreign leaders detailed in 693 pages of classified US documents released Tuesday.

Manhunt  6/20/2007
WASHINGTON - The CIA offered 150,000 dollars to Mafia figures to kill Cuban leader Fidel Castro, just one of several CIA plots against foreign leaders detailed in 693 pages of classified US documents released Tuesday.

Footer

Header

[Quintuplets] (Search)

Search results for "Quintuplets"                               *Advanced Search >*

<u>*< Prev*</u>   Page 1 of 15   <u>*Next >*</u>

Quintuplet Fest '07 - Pensacola, FL  6/20/2007

Authorities believe suspect is in vicinity.
Authorities believe suspect is in vicinity.

Quintuplets Found - Baton Rouge, LA  6/20/2007

Authorities believe suspect is in vicinity.
Authorities believe suspect is in vicinity.

Quint Stint - Memphis, TN  6/20/2007

Authorities believe suspect is in vicinity.
Authorities believe suspect is in vicinity.

Quacky Quints Quandered - Pheonix, AZ  6/20/2007

Authorities believe suspect is in vicinity.
Authorities believe suspect is in vicinity.

<u>*< Prev*</u>   Page 1 of 15   <u>*Next >*</u>

Footer

*FIG.13*

Header

Advanced Search

Search for [Quintuplets]

Location ◉ Within [50 ▼] miles of [78704]
         ○ Nation-wide

[Search]

Date Published ◉ [Anytime ▼]
               ○ Between [01 ▼] [Mar ▼]
                 and [31 ▼] [Jun ▼]

Occuring [Anywhere in the article ▼]

☑ Include user-submitted content
☑ Include professional news articles

Footer

*FIG. 14*

Car Hits Fire Hydrant
97911 (Los Angeles, CA)     Posted to Wrecks *(change)*

*I Like It!*  Flag: *spam, copyright violation, abuse*

Uploaded by gcooper
Tuesday, June 4th 2007
via cell.

Tags car crash downtown
accident ouch
firehydrant

Add:

Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. Stet clita kasd gubergren, no sea takimata sanctus est Lorem ipsum dolor sit amet. Lorem ipsum dolor sitdolores et ea rebum.

Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. Stet clita kasd gubergren, no sea takimata sanctus est Lorem ipsum dolor sit amet. Lorem ipsum dolor sitdolores et ea rebum.

[Header]

Car Hits Fire Hydrant
97911 (Los Angeles, CA)                    Posted to Wrecks *(change)*

*I Like It!*    Flag: *spam, copyright violation, abuse*

Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. Stet clita kasd gubergren, no sea takimata sanctus est Lorem ipsum dolor sit amet. Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. Stet clita kasd gubergren, no sea takimata sanctus est Lorem ipsum dolor sit amet. Lorem ipsum dolor sit amet, consetetur sadipscing elitr, sed diam nonumy eirmod tempor invidunt ut labore et dolore magna aliquyam erat, sed diam voluptua.

posted by gcooper
Tuesday, June 4th 2007
via web.

Tags car crash downtown
accident ouch
firehydrant

Add:

Duis autem vel eum iriure dolor in hendrerit in vulputate velit esse consequat, vel illum dolore eu feugiat nulla facilisis at vero eros et accumsan et iusto odio dignissim qui blandit praesent luptatum zzril delenit augue duis dolore te feugait nulla facilisi.

Ut wisi enim ad minim veniam, quis nostrud exerci tation ullamcorper lobortis nisl ut aliquip ex ea commodo consequat. Duis autem vel eum dolor in hendrerit in vulputate velit esse molestie consequat, vel illum eu feugiat nulla facilisis at vero eros.

[Comments Panel]

[Footer]

SYSTEM AND METHOD FOR PERMITTING GEOGRAPHICALLY-PERTINENT INFORMATION TO BE RANKED BY USERS ACCORDING TO USERS' GEOGRAPHIC PROXIMITY TO INFORMATION AND TO EACH OTHER FOR AFFECTING THE RANKING OF SUCH INFORMATION

CROSS-REFERENCE TO RELATED APPLICATIONS

This utility application claims the benefit under 35 U.S.C. §119(e) of Provisional Application Ser. No. 60/942,841 filed on Jun. 8, 2007 entitled SYSTEM AND METHOD FOR PROVIDING A LOCAL NEWS, INFORMATION AND ADVERTISING PORTAL ON THE INTERNET BASED ON ZIP CODE and Provisional Application Ser. No. 60/944, 145 filed on Jun. 15, 2007 entitled SYSTEM AND METHOD FOR PERMITTING GEOGRAPHICALLY-PERTINENT INFORMATION TO BE RANKED BY USERS' GEOGRAPHIC PROXIMITY TO INFORMATION FOR AFFECTING RANKED DISPLAY TO OTHERS, and Provisional Application Ser. No. 60/969,811 filed on Sep. 4, 2007 entitled SYSTEM AND METHOD FOR INCLUDING A GEOGRAPHICAL FRAMEWORK TO GLOBAL COMPUTER NETWORKS and all of whose entire disclosures are incorporated by reference herein.

BACKGROUND OF THE INVENTION

1. Field of Invention

This invention relates generally to the Internet and, more specifically, to a method and system whereby geographic-specific information (e.g., text, news, images, videos, etc.) can be rated by users in the geographic area and in surrounding areas for affecting ranked display of the information to others.

2. Description of Related Art

The Internet provides access to information world-wide in an instant and in many cases inundates the user with information. National or world news can be obtained on demand and someone selling or promoting goods or services can advertise to the world. However, the user in his/her own community may have no way of knowing "what's going on" in their local community. Certainly, national headlines and news are made available but as to what news and information would be interesting to local users and that would permit them, as well as others, to rate or rank such local news and information, there does not appear to be any available mechanism for accomplishing this.

Web sites such as www.digg.com and www.reddit.com permit users to rate articles but there does not appear to be any relationship of using proximity to geographic locations, and to use such ratings to influence users in these geographic locations to review and further rate them; nor does there appear to be appreciation for using the distances between the various user "raters" when creating the ranking of displayed articles.

See also http://del.icio.us which provides social bookmarking but appears to have the same deficiencies previously described.

The following U.S. patents and publications are examples of recommendation or location-related Internet systems and methods:

U.S. Pat. No. 5,930,474 (Dunworth) discloses a software interface that associates online information with geographic areas.

U.S. Pat. No. 6,460,036 (Herz) discloses a system and method for providing customized electronic newspapers and target advertisements. In particular, the system and method create a "target profile" for each target medium object and generates a user-customized rank ordering list of target objects most likely to be of interest to each user.

U.S. Pat. No. 6,792,573 (Duncombe) discloses a method for playing media, supplied by a user, based on feedback from the user.

U.S. Pat. No. 6,981,040 (Konig, et al.) discloses a method for personalized online information and product services by transparently monitoring user interactions during normal computer use, estimating parameters of a learning machine that defines a user model, analyzing documents based thereon and then estimating the probability that the user is interested in the document by using the model.

U.S. Pat. No. 6,985,588 (Glick, et al.) discloses a system & method for controlling access to digital information based on a location identity attribute; thus, such information can only be accessed by a user at the specific geographic location.

U.S. Pat. No. 7,071,842 (Brady, Jr.) discloses a location-based and preference-based system and method for matching the profiles of the attributes and/or characteristics of persons, places and/or things with the expressed preferences of mobile users, e.g., travelers, to alert and direct such users, via handheld devices (e.g., cell phones, PDAs, etc.) to any places having attributes matching the user's express preferences.

U.S. Pat. No. 7,080,064 (Sundaresan) discloses self-correcting business rating system.

U.S. Pat. No. 7,013,238 (Weare) discloses a system & method for generating recommendations that automatically optimizes over time without human intervention. The invention utilizes a genetic algorithm that includes parameters that are adaptively updated.

U.S. Pat. No. 7,231,405 (Xia) discloses a method and apparatus of indexing web pages of a web site for geographical searching based on user location.

U.S. Patent Application Publication No. 2005/0004948 (Navar, et al.) discloses a system and method for the facilitation of local community-based, person-to-person connections and transactions on national, international or global scale. The system/method uses local content such as postings of items available within a certain distance of the user's community.

U.S. Patent Application Publication No. 2005/0080786 (Fish, et al.) discloses a system and method for customizing search results based on the searcher's actual geographic location when the search query was transmitted using a wireless device. Geographic location is extracted from the user's signals containing the search query. The search engine compares the searcher's actual geographic location against the geographic location information in the searchable resources for determining one or more parameters and then filters and ranks the search objects based on the determined parameters.

U.S. Patent Application Publication No. 2005/0278309 (Evans, et al.) discloses a system and method for mining and searching localized business-marketing and information.

U.S. Patent Application Publication No. 2006/0085392 (Wang; Lee, et al.) discloses a system and method for automatically analyzing Web searches for generating locality-selected results based on the user's location but also based on the business or other content provider's location and the degree of local intent in the user's query. Locale indicia (postal zip code, geographic area name, telephone number, etc.) are used.

U.S. Patent Application Publication No. 2006/0200490 (Abbiss) discloses a system and method for geographical indexing whereby a user-selected location is obtained by providing a user with a graphical map and receiving a user-selected location on the graphical geographical map. Geographically indexed search results are obtained by indexing a plurality of search results which are then displayed to the user.

U.S. Patent Application Publication No. 2006/0218146 (Bitan, et al.) discloses a system and method for an interactive user-controlled relevance ranking of retrieved information in an information search system.

U.S. Patent Application Publication No. 2006/0271531 (O'Clair, et al.) discloses a system and method for scoring local search results based on location prominence.

U.S. Patent Application Publication No. 2007/0005419 (Horvitz, et al) discloses a method whereby collaborative filtering is combined with location logs and location updates in order to recommend location or services information to a user that arrives at a location.

U.S. Patent Application Publication No. 2007/00156435 (Greening, et al.) discloses a system and method for finding location-associated items.

U.S. Patent Application Publication No. 2007/0047568 (Wang, et al.) discloses a system and method for providing locally-applicable Internet content with secure action requests and item condition alerts. The invention uses a cache with Internet content that is determined to be locally-applicable based on monitoring the Internet content accessed by users from particular locations.

U.S. Patent Application Publication No. 2007/0061301 (Ramer, et al.) discloses a system and method for user characteristic-influenced search results. In particular, information relating to user characteristics associated with a mobile communication facility (e.g., a cell phone) and other capabilities are used to improve the presentation and relevance of mobile content to appropriate or desirable mobile communication facilities.

U.S. Patent Application Publication No. 2007/0061302 (Ramer, et al.) discloses a system and method for location-influenced search results. In particular, information relating to the location of the mobile communication facilities (e.g., a cell phone) and other capabilities are used to improve the presentation and relevance of mobile content to appropriate or desirable mobile communication facilities.

U.S. Patent Application Publication No. 2007/0100955 (Bodner) discloses a system and method for using known geographic locations of Internet users to present content web pages.

U.S. Patent Application Publication No. 2007/0118520 (Bliss, et al.) discloses a method for receiving on a mobile device a search query associated with a geographic location and then presenting search results associated with a geographic location in a graphical display.

International Publication WO 00/52934 (Gofman, et al.) discloses a system and method for serving local and global media content at a local site according to at least one locally-determined characteristic of the audience to which the combined content is provided.

The following are non-patent publication literature pertaining to recommendation systems which basically use information about the user to provide suggestions to the user:

Joshua Alspector, Aleksander Kolcz, and Nachimuthu Karunanithi. *Comparing feature-based and clique-based user models for movie selection*. In Proc. of Digital Libraries 1998, 1998.

Marko Balabanović. *An adaptive web page recommendation service*. In Proc. of the 1st International Conference on Autonomous Agents, February 1997.

John Breese, David Heckerman, and Carl Kadie. *Empirical analysis of predictive algorithms for collaborative filtering*. Technical Report MSR-TR-98-12, Microsoft Research, 1998.

Dhiraj Goel and Dhruv Batra. Predicting user preference for movies using netflix database. Student class project report.

Jennifer Golbeck. *Computing and Applying Trust in Web-Based Social Networks*. PhD thesis. University of Maryland, College Park, 2005.

Jennifer Golbeck. *Generating predictive movie recommendations from trust in social networks*. In Proc. of the 4th International Conference on Trust Management (iTrust), 2006.

Jennifer Golbeck. *Personalizing applications through integration of inferred trust values in semantic web-based social networks*. In Proc. of the Semantic Network Analysis Workshop, 2005.

Ken Goldberg, Theresa Roeder, Dhruv Gupta and Chris Perkins. *Eigentaste: A constant time collaborative filtering algorithm*. Information Retrieval, 4:133-151, 2001.

Joseph Konstan, Bradley Miller, David Maltz, Jonathan Herlocker, Lee Gordon and John Riedl. Grouplens: *Applying collaborative filtering to usenet news*. Communications of the ACM, 40(3), March 1997.

H. J. Lee and Sung Joo Park. *Moners: A news recommender for the mobile web*. Expert Systems with Applications, 32:143-150, 2007.

G. Linden, B. Smith, and J. York. *Amazon.com recommendations: Item-to-item collaborative filtering*. IEEE Internet Computing, 7(1):76-80, January/February 2003.

Stephen Marsh. *Formalising Trust as a Computational Concept*. PhD thesis, University of Stirling, 1994.

Andreas Mild and Thomas Reutterer. *An improved collaborative filtering approach for predicting cross-category purchases based on binary market data*. Journal of Retailing and Consumer Services Special Issue on Model Building in Retailing and Consumer Service, October 2002.

Steffen Schilke, Udo Bleimann, Steven Furnell, and Andrew Phippen. *Multi-dimensional personalization for location and interest-based recommendation*. Internet Research, 14(5):379-385, 2004.

M. van Setten. *Personalised information systems*. Technical Report TI/RS/2001/036, Telematica Instituut, June 2001.

The following are non-patent publication literature pertaining to news recommendation systems:

Liliana Ardissono, Luca Console, and Ilaria Torre. *An adaptive system for the personalized access to news*. AI Communications, 14(3):129-147, 2001.

Orkut Buyukkokten, Junghoo Cho, Hector Garcia-Molina, Luis Gravano, and Narayanan Shivakumar. *Exploiting geographical location information of web pages*. In WebDB (Informal Proceedings), pages 91-96, 1999.

Abhinandan Das, Mayur Datar, and Ashutosh Garg. *Google news personalization: Scalable online collaborative filtering*. In Proc. of WWW 2007, 2007.

Junyan Ding, Luis Gravano, and Narayanan Shivakumar. *Computing geographical scopes of web resources*. In Proc. of the 26th VLDB Conference, 2000.

Joseph Konstan, Bradley Miller, David Maltz, Jonathan Herlocker, Lee Gordon, and John Riedl. *Grouplens: Applying collaborative filtering to use net news*. Communications of the ACM, 40(3), March 1997.

Joseph A. Konstan. *Introduction to recommender systems: Algorithms and evaluation*. ACM Trans. Inf. Syst., 22(1): 1-4, 2004.

Raymond Mooney. *Content-based book recommending using learning for text categorization.* In Proc. of the 5th ACM Conference on Digital Libraries, June 2002.

Shopping.com, Inc. Epinions.com. http://www.epinions.com.

Andrew Trotman, Timothy Jones, and Chris Handley. *Recommending geocaches.* In Proc. of the 10th Australasian Document Computing Symposium, December 2005.

The following are non-patent publication literature pertaining to location awareness systems which take into account user location or environment:

Mauro Brunato and Roberto Battiti. *PILGRIM: A location broker and mobility-aware recommendation system.* In Proc. of the First IEEE International Conference on Pervasive Computing and Communications, 2003.

Mauro Brunato, Roberto Battiti, Alessandro Villani, and Andrea Delai. *A location-dependent recommender system for the web.* Technical Report DIT-02-0095, Universitádi Trento, Nov. 2002.

Wesley Chan. Dealfinder: A collaborative, location-aware mobile shopping application.

Andrew Fano. *Shopper's eye: Using location-based filtering for a shopping agent in the physical world.* In Proc. of the Second International Conference on Autonomous Agent, pages 46-421, May 1998.

Google, Inc. Google local. http://local.google.com.

Groundspeak, Inc. Geocaching—the official global gps cache hunt site. http://www.geocaching.com.

T. Gross and M. Specht. *Awareness in context-aware information systems.* In Proc. Mensch Computer 2001, 2001.

Tzvetan Horozov, Nitya Narasimhan, and Venu Vasudevan. *Using location for personalized poi recommendations in mobile environments.* In SAINT '06: Proceedings of the International Symposium on Applications on Internet, pages 124-129, Washington, D.C., USA, 2006. IEEE Computer Society.

Kevin Keenoy and Mark Levene. *Personalisation of web search.* Intelligent Techniques for Web Personalization, pages 201-228, 2005.

Mehran Nadjarbashi-Noghani, Jie Zhang, Hossein Sadat K. M., and Ali Ghorbani. *PENS: A personalized electronic news source.* In Proc. of the 3rd Annual Communication Networks and Services Conference, 2005.

Reinhard Oppermann and Marcus Specht. *A context-sensitive nomadic exhibition guide.* In HUC, pages 127-142, 2000.

Topix, LLC. Topix, 2007. http://www.topix.net.

Chin-ShungYang, Szu-Pyng Kao, Fen-Bin Lee, and Pen-Shan Hung. *Twelve different interpolation methods: A case study of surfer* 8.0 In Proc. of the XXth ISPRS Congress, Geo-Imagery Bridging Continents, July 2004.

Yelp. Yelp.com. http:/www.yelp.com.

Thus, there remains a need for a providing a system or method for permitting geographically-pertinent information provided on the Internet to be ranked by users, while taking into account the users' geographic proximity to the information, the distance between each user who rates the information, the age of the information, and the age of the users' ratings to determine a ranking of such information.

All references cited herein are incorporated herein by reference in their entireties.

BRIEF SUMMARY OF THE INVENTION

A method for permitting information (text, news, images, video, combinations of both, etc.) specific to a geographic location (e.g., a zip code, a community, township, congressional or senatorial district, city, longitude/latitude coordinate, etc.) to be rated by users in the geographic location and by users, in other locations concentrically located from the geographic location, for providing the most relevant information in an ordered rank to users in that geographic location and in other locations concentrically located (e.g., surrounding area zip codes, communities, etc.) from the geographic location. The method comprises: (a) providing information that is pertinent to the geographical location; (b) making such information available to users in the geographical location; (c) permitting the users in the geographical location to rate the information, and along with temporal and physical parameters (e.g., age of information, age of ratings by users, distance of raters from the information, distance between the various users that are rating the information, etc.), to form first user responses; (d) providing the first user responses to a ranking engine for determining a first level rank for the information; (e) permitting users in the other locations concentrically located from the geographic location to experience the information and to rate the information, and along with temporal and physical parameters, to form second user responses; (f) providing the second user responses to the ranking engine for determining a second level rank; (g) repeating steps (e) and (f) to modify the second level rank to form a revised level rank; and (h) providing the information, in ordered rank, to the users in the geographic location and in the other locations based on the revised level rank.

An interactive system for permitting information (text, news, images, video, combinations of both, etc.) specific to a geographic location (e.g., a zip code, a community, township, congressional or senatorial district, city, longitude/latitude coordinate, etc.) to be rated by users in the geographic location and by users, in other locations concentrically located (e.g., surrounding area zip codes, communities, etc.) from the geographic location, for displaying the most relevant information, in an ordered rank, to users in that geographic location and in other locations concentrically located from the geographic location. The interactive system comprises: a database for storing articles associated with respective geographic locations; a first exchange, coupled to the database, for receiving information from an aggregator feed of Internet news content; a second exchange, coupled to the database, for receiving information from mobile devices (e.g., cellular phones, personal digital assistants, video cameras, digital cameras, etc.) or web browsers; an interactive Internet application, coupled to the database, through which users in a given geographic location can experience information pertinent to their respective geographic location and rate the information, and along with temporal and physical parameters (e.g., age of information, age of ratings by users, distance of raters from the information, distance between the various users that are rating the information, etc.), to form first user responses, wherein the Internet application comprises a ranking engine for determining a first level rank for the information from the first user responses; and wherein users in other locations concentrically located from the geographic location can also experience the information and rate the information, and along with temporal and physical parameters (e.g., age of information, age of ratings by users, distance of raters from the information, distance between the various users that are rating the information, etc.), to form second user responses that are provided to the ranking engine for determining a second level rank, and wherein the second level rank is used to display the information in an ordered rank to the users in the geographic location and in the other locations based on the second level rank.

A method for permitting geographically pertinent information (text, news, images, video, combinations of both, etc.) to be experienced by users in a corresponding geographical location (e.g., a zip code, a community, township, congressional or senatorial district, city, longitude/latitude coordinate, etc.) and in other locations concentrically located (e.g., surrounding area zip codes, communities, etc.) from the geographic locations. The method comprises: organizing information pertinent to a respective geographic location to be assigned a virtual point; allowing users in the geographical location to rate the information; calculating rank levels of the information using a ranking engine, wherein the calculation involves user ratings, temporal and physical parameters to form an ordered rank; displaying the ordered rank of the information to other users in the geographic location to influence the interest of the other users in further rating the information; causing the information to be disseminated to other locations concentrically-located from the geographic location by providing the ratings, as well as temporal and physical parameters, of the users in the other locations concentrically-located from the geographic location to the ranking engine whereby the information is disseminated at increasing radii with respect to the virtual point; and creating a virtual three-dimensional cone of information expansion away from the virtual point as more user ratings are fed to the ranking engine.

BRIEF DESCRIPTION OF SEVERAL VIEWS OF THE DRAWINGS

The invention will be described in conjunction with the following drawings in which like reference numerals designate like elements and wherein:

FIG. 2A provides an exemplary diagram of a news feed operation for the news exchange;

FIG. 2B provides an exemplary diagram of a mobile device exchange;

FIG. 4 is a flow diagram of an exemplary collection of news site metadata of the present invention;

FIG. 5 is an exemplary screen display of an exemplary implementation of a system of the present invention;

FIG. 12 is the home page display screen of the present invention;

FIG. 13 is a display screen for the search results page of the present invention;

FIG. 14 is a display screen for the advanced search of the present invention;

FIG. 15D is a display screen for an exemplary video article, including accompanying text;

FIG. 15E is a display screen for an exemplary text-only article;

DETAILED DESCRIPTION OF THE INVENTION

The invention allows for the presentation of information based upon the relevance to a user and the interest to the user, those parameters being measured in distance (and age of information) and user rating (as well as age of user ratings), respectively. Interest may also be measured by tracking the location of a user of the system as that user accesses a piece of information. The application of such information ranked on the basis of these parameters, provided by this invention, is limitless. By way of example only, the ranking of such information can be used as an input parameter (along with other input parameters) in a search, e.g., a user could search for the highest ranked story which mentions President George W. Bush in Miami, New York or Los Angeles; by including the rank parameter in the search, a user could see which story about President Bush each community responded to the most. By having a current, accurate measure of the most popular news stories in given communities provided by the present invention, a wide range of advantages in marketing, advertising, political polling, sociology research, etc., is now available that was not previously. It should noted that the present invention has especially good advantages for geographically targeted advertising because if a merchant knows the most popular news story for a given community, he/she can use that information to immediately modify his/her advertising choice on other related web pages, in brochures or other aspects of his/her marketing campaign. These modifications will occur at the time that the news story is popular, thus making the marketing/advertising pertinent or associated with that news story. An important aspect of the present invention is that it provides a database of information rankings for each geographical community that is now available for an unlimited number of uses.

As will also be discussed in detail later, the present invention permits the movement of the information through geographic space to be visualized using a geographic expansion system (GES, which is discussed in detail later) which supports the ability to capture the ranking of information for each community as an ongoing time series. One exemplary illustration of this is via the use of color on a virtual map wherein the rank of a given news story in each community is animated as its rank changes with time. By monitoring this over time, a user can see how "news" moves through geographic space as users respond to certain stories. Among other things, this feature can depict which news stories move uniformly and which new stories only travel through certain areas, communities, etc.

Figure 1:
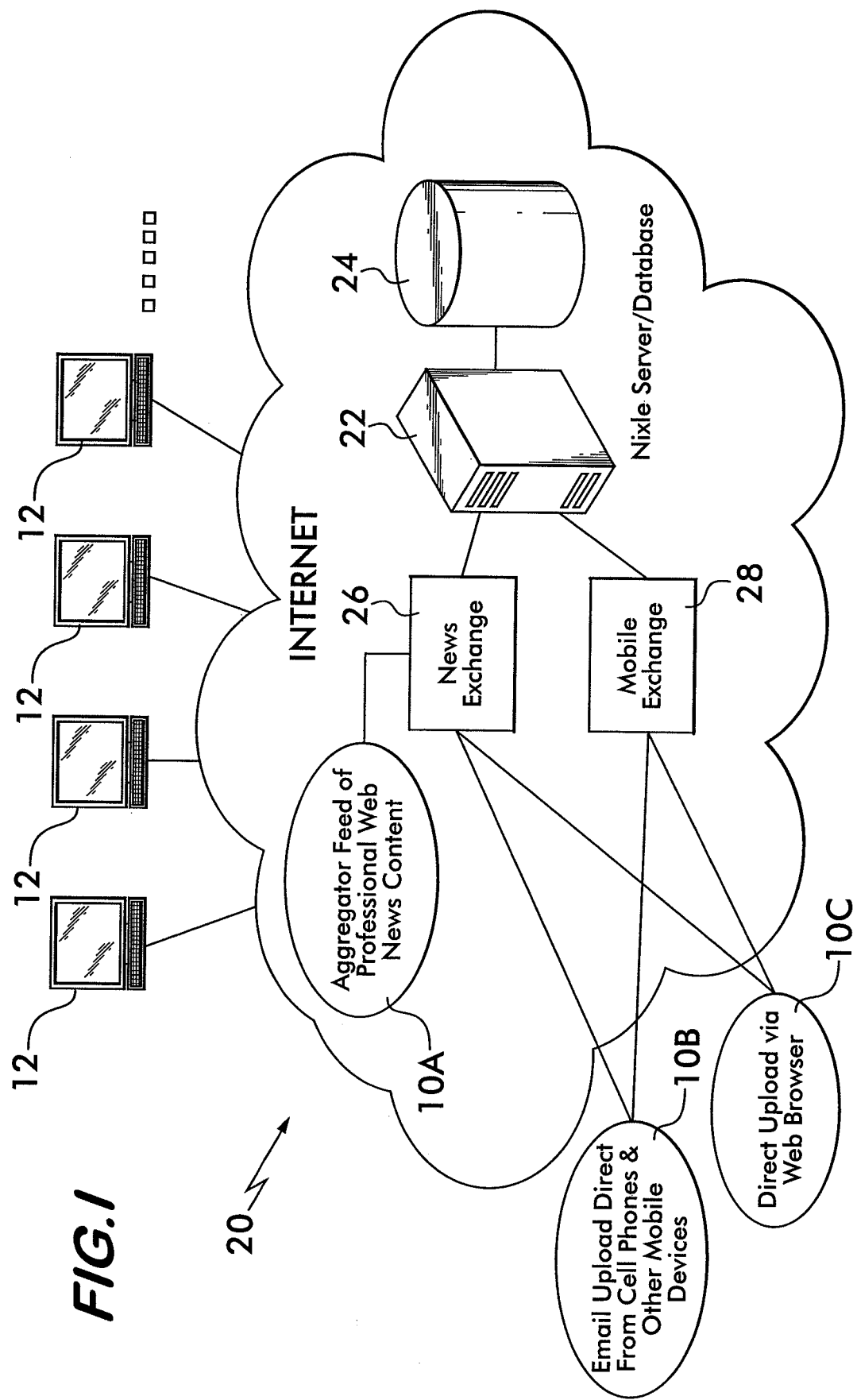
FIG. 1 depicts a block diagram of the system and method of the present invention.
Figure 2:
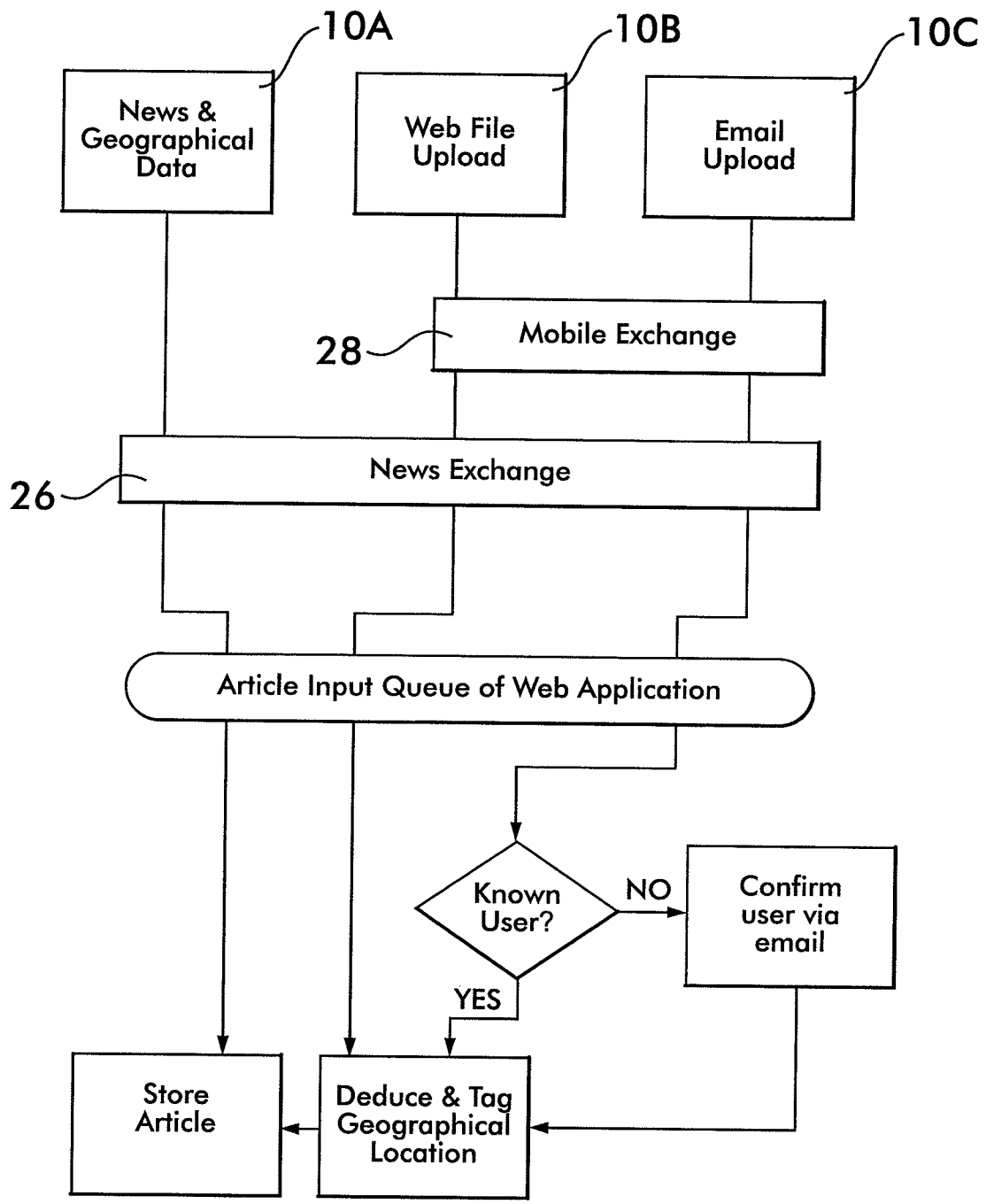
FIG. 2 provides a flow diagram of the initial content acquisition process of the present invention.

As shown in FIG. 1, the present invention 20 (also referred to as "Nixle") comprises a web server 22 and associated database 24. The present invention 20 obtains input from three primary sources: aggregator feed of professional web news content 10A, email 10B directly from cell phones and other mobile devices and web browsers 10C. It should be understood that whereas the first input source 10A can only feed a "news" exchange 26 of the web application 20, the other two input sources 10B and 10C can feed either the news exchange 26 or a "mobile exchange" 28 of the web application. Computers 12 represent users who can experience any article provided to the present invention 20 to review and rate their interest in such articles. FIG. 2 depicts the content acquisition process of the present invention 20 and FIGS. 2A and 2B provide exemplary operations for the news exchange and the mobile exchange, respectively. The news portion of the portal provides the user with news relevant to his/her selected location.

It should be understood that with regard to news information, such information does not need to be, or is not limited to, professional news.

News+Geographical Data: Content Via Aggregator Feed 10A

The input system of the present invention 20 is presented with news articles from an aggregator feed. The aggregator feed is composed of a set of components which have a net result of extracting news stories from a wide variety of Internet sources, determining where each story occurred, and tagging them with appropriate geographical location information. The aggregator feed comprises the following components: a feed database, a scraper, filtering, national news, duplicates, localizer, feed location, meta data, article content, natural language parsers and Bayesian filters.

Feed Database:

This is a listing of news sources—feed sites—located on the Internet along with necessary configuration data to allow a scraper process (discussed below) to extract the data from current individual news stories. This database is generated from human input. Once feeds are identified, instructions to parse those feeds have to be configured. A graphical application is used to point out the important parts of a feed. The index page, which lists many news articles, needs to be identified along with a typical headline, date, and summary. A typical article page also has its parts identified. Once the parts of the feed are identified, the HTML paths of the parts are saved into a database for later scraping. Attempts to automatically identify the parts of a feed are displayed to an application operator for approval or alteration.

Scraper

A scraper process walks through feed sites and scrapes articles from it. This requires access to the feed database and a link to a database shared by it and a localizer into which raw articles are dumped. This process can run independently of the rest of the system. It runs constantly, checking each feed once every 15 minutes to an hour for new content. It can run on many servers. The servers share a common queue of feeds so that only one scraper is processing a particular feed at a time. Key technologies involved in the scraper process includes MySQL, Cron, and Python. The latter includes "Beautiful Soup" and "SqlAlchemy."

Filtering

Once news has been collected, it is necessary to filter the news which needs to be localized.

National News

Each news item is compared to national news agency (e.g., AP (Associated Press) or similar, etc.) feed items within a certain date range. If the new item appears to have come directly from an AP source, it is discarded because the present invention 20 is only concerned with local news. Alternatively, a complete news archive is available to filter out national news. Moreover, if a news item appears from many different sources at once, it is most likely not local news.

Duplicates

If news is already in the archive and posted by another news source, it is considered a duplicate and removed. News that is similar to previously posted news may be considered related and linked to the other news as a related item.

Localizer

Figure 3:
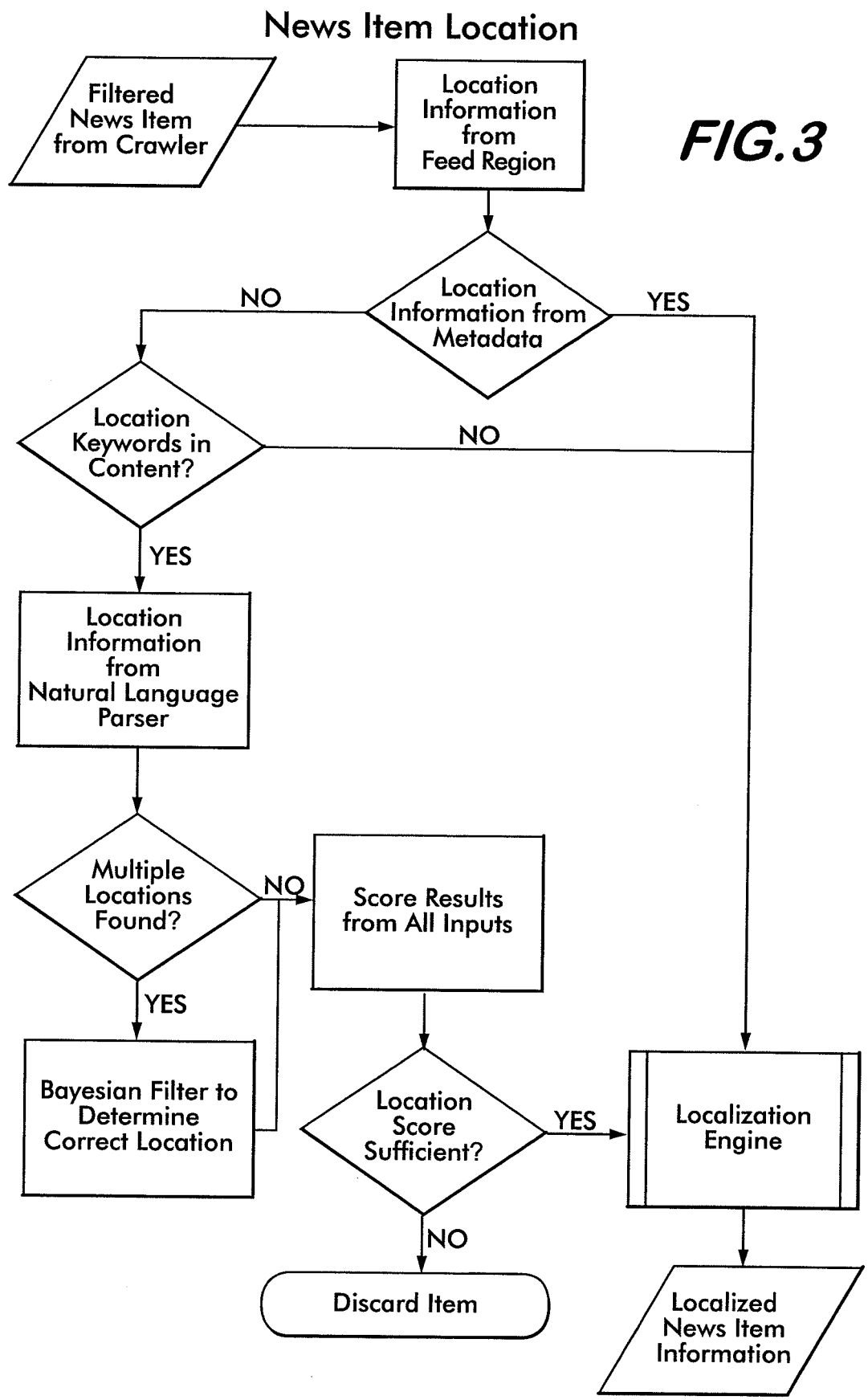
FIG. 3 is a flow diagram of an exemplary news item localization process of the present invention.

This process takes raw articles and localizes them. FIG. 3 provides an exemplary news item localization process. It needs access to the geography, article archive, and raw article databases. This process runs independently of the rest of the system. It runs constantly, checking for new raw articles in the database to localize. It can run on many servers. It pulls news out of the raw article database immediately to make sure that only one process has access to an article to allow for concurrent processing. Key technologies involved in the scraper process includes MySQL, Cron, and Python. The latter includes "Beautiful Soup" and "SqlAlchemy."

Once news is collected and filtered, it is necessary to identify to what the news pertains. Several concurrent methods can be used to accomplish this. The results of each method can be scored together. Identification begins with a broad association of location and narrows the location down with each method.

Feed Location

If the feed only covers a small region, it can be assumed that the articles within it are already localized to that region. This is the default location for an article.

Meta Data

Some feeds are generous enough to mention exactly the location of the article in a way that is consistent and easily parseable. FIG. 4 provides an exemplary process flow for collecting news site metadata shown comprising two phases.

Article Content

The content of a story usually mentions the location to which it is pertinent. Thus, the content can be searched for known location names such as cities, states, zip codes, and street names. It is possible that a story mentions multiple locations and may be equally relevant to those locations.

Natural Language Parsers

A natural language parser can be used to determine if words that serve many meanings are actually describing a location.

Bayesian Filters

Bayesian filters can be used to determine if an article statistically looks like other articles from that location.

Email Upload 10B: Email (Cell Phone Exchange)

With regard to the email input 10B, the present invention 20 permits the user to email media to the system from his/her mobile device (not shown). The following is an example of the user interaction:

| Step | Action |
| --- | --- |
| 1 | User captures image or video clip with his/her cell phone; |
| 2 | User emails the item to a predetermined email address corresponding to the zip code from which the item was captured. |

| Step | Action |
|---|---|
| Result | The emailed content is immediately included on the local news page for the zip code to which it was emailed. |
| Optional | The user can optionally add text or format the content via the web interface at a later time (similar to Web File Upload 10C discussed below). |

A SMTP server listens for incoming emails. Based on the email address to which it was addressed, several actions can occur:

First, based on the origin email address: If the email address or telephone number of the sender is not recognized to be a user of the system, the article is placed into a waiting area and a sequence of confirmation messages is sent out, to which the user must respond. Otherwise the article is associated with the appropriate account.

If the destination email address is assigned to a user's Mobile Exchange 28 private holding area, the article is placed in the appropriate holding database. No further action will be taken by the system until the user chooses to do something with the article.

If the destination email address is a zip code, a geolocation is assigned to the article based on this zip code.

If the destination email address is associated with the News or Mobile Exchange portions of the site the article is assigned to the appropriate live article database.

Web File Upload 10C: (Mobile Exchange)

With regard to the web browser 14 input, FIG. 5 provides an example of such a screen display.

| Step | Action |
|---|---|
| 1 | User enters a headline for the article. |
| 2 | User optionally enters a body for the article. |
| 3 | User presses the "Browse . . . " button for each file he/she wishes to upoload. |
| 4 | User chooses a category that best describes the media the user is uploading. |
| 5 | User enters the location where the media is captured. The system attempts to pre-fill this field with the user's home location. |
| 6 | User optionally enters one or more tags to assign to the uploaded media. |
| 7 | When the "Upload" button is clicked, the content is uploaded to the local news area for the zip code provided. |
| 8 | User assigns the article to the News Exchange, Mobile Exchange or their holding bin. |
| Result | User is taken to a page showing the newly-uploaded media. |

Geographic Expansion System (GES) 30

The present invention 20 is based upon a geographic expansion system (GES) 30 which allows any piece of news content to geographically expand outward, e.g., in concentric circles, and on geographic planes, depending upon relevance, interest, or importance.

Figure 6:
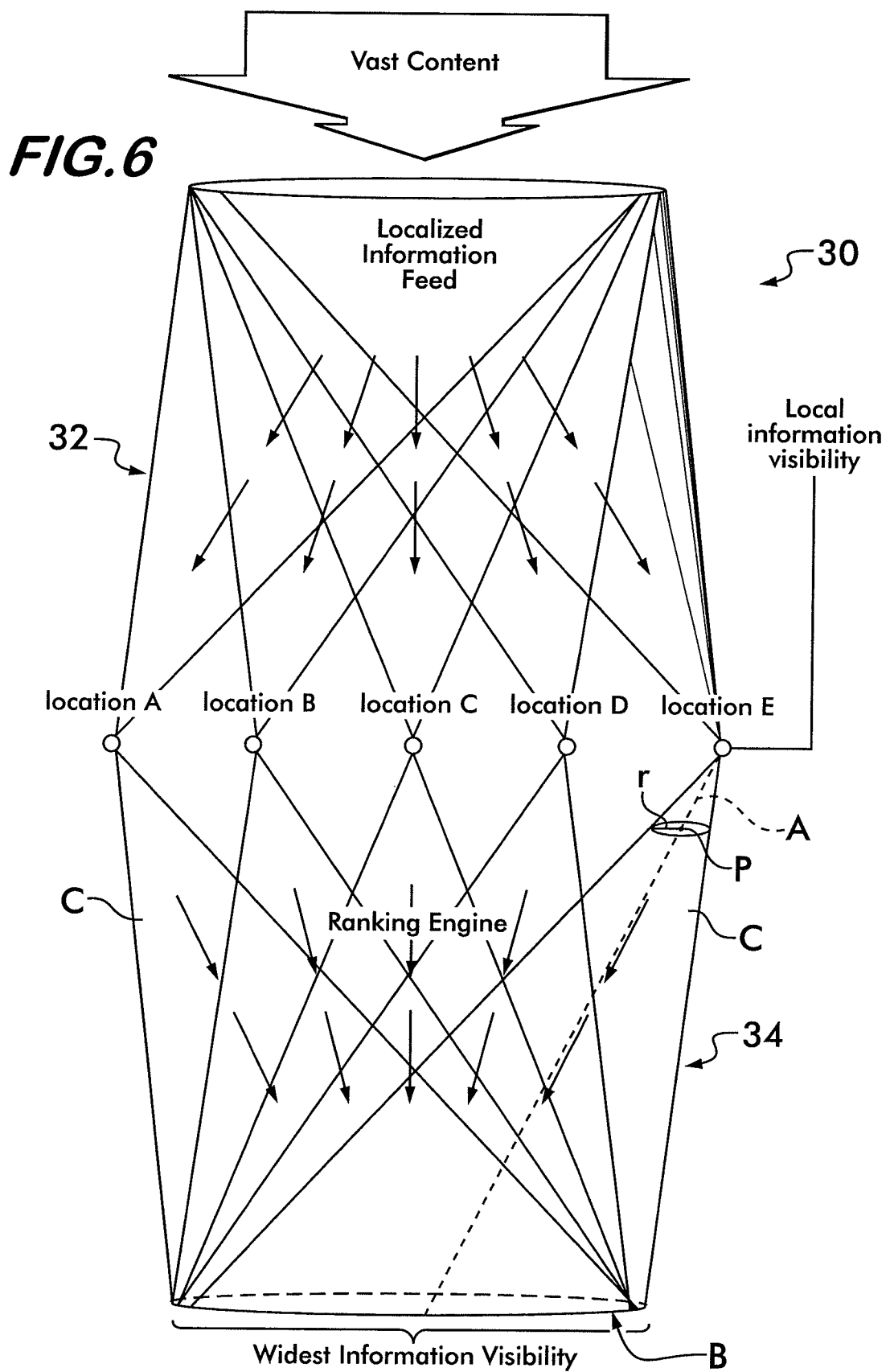
FIG. 6 is a functional diagram of the geographic expansion system (GES) of the present invention.

FIG. 6 shows the GES 30 as a two-step process 30 of the present invention 20, whereby the location of any event is determined 32 and information related to that event is then rated and presented 34. The top portion or "first crown" 32 of FIG. 6 represents the determination of location while the bottom half or "second crown" 34 represents the rating and presentation process. In particular, an infinite body of information exists in the form of text, photography, video or other media. Each of these pieces of information relates to a single event, which, by definition, occurs at a single location. The top portion 32 of FIG. 6 represents the process whereby that single location is determined for each piece of raw information. This first process 32 is completed when the media relating to the event reaches the point associated with the location of the event.

Another way to look at the process is that it forms a source of information which is tagged (or organized in an equivalent way) with geographical location information. This source provides the information input for every location tracked by the ranking engine (which forms a part of the lower crown 34, and will be discussed later). Examples of the first process 32 are the following:

Topix.net provides news localized for communities in the US. The totality of all the stories sorted by each community is an example of a localized information feed. This example page is the local feed for Corvallis; http://www.topix.net/city/corvallis;

Similar news services which provide localized news include MSNBC:

http://www.msnbc.msn.com/id/3085243 and Yahoo Local:

http://news.yahoo.com/local/Boise

As mentioned previously, it should be understood that the information does not need to be professional news. Citizenbay provides a forum where user-generated content is organized geographically. Here is an example page for New York.

http://www.citizenbay.com/Opinions/New_York/328394/3

The bottom portion 34 of FIG. 6 represents the ranking and presentation mechanism of the invention 20. It is conceptually comprised of a plurality of cones, each one projecting downward from its geographical point, e.g., a zip code. The radius, r, (see FIG. 6) of the cone C at any downward distance from the point represents a geographical distance from that point, P, which point is also projected downwards, always remaining at the center of any plane of the cone. An axis A of the cone is shown by a hatched line between the vertex (e.g., a defined geographic location) and the base B of the cone. As can be seen from FIG. 6, the plurality of cones have intersecting or overlapping portions or regions.

Information in the invention 20 can be ranked by user vote, wherein the vote signals interest in the information and is to the geographical location of the user. Interest may also be measured by tracking the location of a user of the invention 20 as that user accesses a piece of information. Age of the information, as well as age of the previous users' ratings are also considered. As the invention 20 progresses downward, it adjusts the quantitative ratings and relative rankings of pieces of information to correspond to the number of users of the system within the geographical area specified by distance from the point of the cone, i.e. geographical radius r around the occurrence of the event.

In FIG. 6, for example, "location A" may represent the zip code 22030 (Fairfax, Va.), while "location B" represents 19103 (Philadelphia, Pa.), "location C" represents 19106 (Philadelphia, Pa.), "location D" represents 98052 (Redmond, Wash.) and "location E" represents 75209 (Dallas, Tex.). In practice, more than 40,000 of these points would exist if they represented zip codes. However, any geographical designation may be used, including but not limited to address, longitude/latitude, etc.

Users 12 of a website based on the invention 20 are presented with information based upon a determination of relative rank. The primary component of the ranking formula is geographical distance from the user. This may be referred to as "geographical relevance." At a "virtual point" representing 22030 (Fairfax, Va.) a user sees information related to occurrences in 22030 only. Likewise, users in 98052 (Redmond, Wash.) see information related to occurrences there, but not elsewhere. As the invention 20 descends through a cone C, the geographical area and therefore geographical relevance expands. For example, a user in 22030 who has caused the system to descend to a plane having a radius 5 miles in a zip code based will see information geographically relevant to 22030 and any zip code within a 5 mile radius of 22030.

The system also ranks information based upon user interest. The information becomes more highly rated in a specified zip code as users in that zip code "vote" for that information and/or view that information. The invention 20 then presents to the user, in descending order of rank, the most highly ranked information relevant to that geography.

By way of example only, a fire occurs at an office building in 22030. A text-based news story is entered into the system. Because of its geographical relevance, a user of the system who is in 22030 sees that story. A user in 19103 will not see that story. If the user in 22030 views that information, the invention 20 increases the "interest" component of the information's rating. The user may also "vote" for the piece of information, expressing interest in it and thereby also increasing the interest component of its rating. If 87 users in 22030 find that information interesting and view and/or vote for it, its rating increases accordingly. This news story and other pieces of information can be ranked relative to one another so that users in 22030 see geographically relevant information, displayed in descending order of rank.

Similarly, it is assumed that the company owning the office in 22030 is located in 98052 (Redmond, Wash.). The story has no geographical relevance to 98052. However, if a user in 98052 views/votes for the story, the invention 20 increases the interest component of the story in 98052. If a sufficient number of users in 98052 view/vote for the story related to the fire in 22030 to increase its rating to a higher value than a story local (geographically) to 98052, the fire story is then ranked higher in 98052 than the local story in 98052 and will therefore be displayed before the local story for 98052 users.

The invention 20 adjusts its computation of quantitative rating and relative ranking based on the radius r of the cone C, i.e., the geographical area selected. Continuing with the above example, it is assumed that users in 22030 caused the fire story to have a local rating of 87 and users in 98052 caused the same story to have a local rating of 300. It is also assumed that 22031 is within 1 mile of 22030 and the fire story has a rating of 2 in 22031. Finally, it is assumed that no other user in any location has read or voted for the fire story. If a user in 22030 causes the system to compute the ranking of stories within a 5 mile radius of 22030, the fire story's rating will be 89 and its relative rank will be based on all stories in 22030, 22031 and any other zip code within 5 miles of 22030. Finally, if viewed at a national level, for instance, to determine what information is of interest to all users of the system in the United States (which is defined by the common base, B, of the crown; see FIG. 6), the rating of the fire story will be 389 and that rating will cause it to be ranked relative to every story in any U.S. zip code.

Note that while the above example uses a 1-point increment for a view or vote, the system may compute the actual quantitative rating of a piece of information on a weighted basis. For instance, geographical relevance may be a +1, viewing a +0.25 and voting a +0.75.

The following is another example of how the present invention operates when a story is transferred from one exchange to another. Assume New York (NY) and Santa Monica are both having street fairs. A story appears about the NY fair in a local NY paper, and the present invention system crawler picks it up and locates it in the NY exchange (this process of "localizing" the story represents the mechanism for the "first crown" (i.e., the top portion 32) of the GES 30). It is further assumed that there are 20,000 "live" stories in the present invention 20 currently. In NY, because the fair story is so freshly relevant, it happens to appear ranked at #5 behind a few popular stories in NY. It has zero rating so far, so only its relevance is helping its rank. However, it is very fresh and relevance is enough to get it seen. In surrounding exchanges, the story ranks a bit lower, e.g., #30 as it is less relevant.

In Santa Monica (SM), the story has close to zero relevance due to the long distance and zero rating, so its rank should be somewhere close to the bottom. It is assumed that it is located at the bottom, ranked $20,000^{th}$. There is no way that a SM user is ever going to see a story ranked that low, but technically the story does have that rank in SM.

In the NY exchange people start taking an interest in the story, because the fair is happening soon. Its rating goes up. After an hour, the story's relevance has gone down—it is not as fresh—but it more than makes that up by having a high, fresh rating. That moves it up to #2 in the NY exchange. In surrounding exchanges a few people read and rate the story. It also gains from the ratings in the NY exchange. It moves up from #30 to #10. This is the process a story goes through to expand outward in geographic space. At this point in SM, the story gains a little from the ratings in the NY area. They are far away, so it does not gain much, but it might move from #20,000 to #19950 in the ratings. It is still so far off the charts that nobody in SM will ever see it, but it was affected by the NY ratings.

Further, assuming that someone in NY reads the story and sends a link to his sister in SM. This process of positively sending a news story directly to another person in another remote exchange is referred to as "finding out by an external mechanism" part. He (NY) knows that SM is having a street fair too, and thinks his sister might be interested. She happens to be on the SM street fair committee, and shares the story at a committee meeting. She thinks it has some great ideas and so do several other committee members. Ten of them rate the story. Now the story still has about zero relevance in SM. However, it now has ten local ratings, which are very fresh. This might be enough to run it from #19950 to #9 in local rank in SM. It has "colonized" SM, and now people will start seeing it when they read the SM news. If more of them start rating it, it might be able to move outward from SM in geographic space, just the same way it is in NY.

It should be understood that the zip code is used by way of example only as an efficient way of defining what is meant by a "local community". However, it is within the broadest scope of the present invention to include any and all other mechanisms for defining a local community (e.g., a congressional district, a senatorial district, a township name/number, a county name/number, an area code, longitude/latitude coordinate, etc.). The key concept is that there is some indicia of identifying "a community" that can be input to a computer for focusing on a particular community or communities. As a result, the present invention is not limited, in any way, just to zip codes.

Figure 7:
FIG. 7 depicts an exemplary country, e.g., the United States, whereby 3 distinct news items have been processed through the GES and the corresponding ranking algorithm displays respective graphics for the instantaneous interest in these distinct news items.
Figure 8:
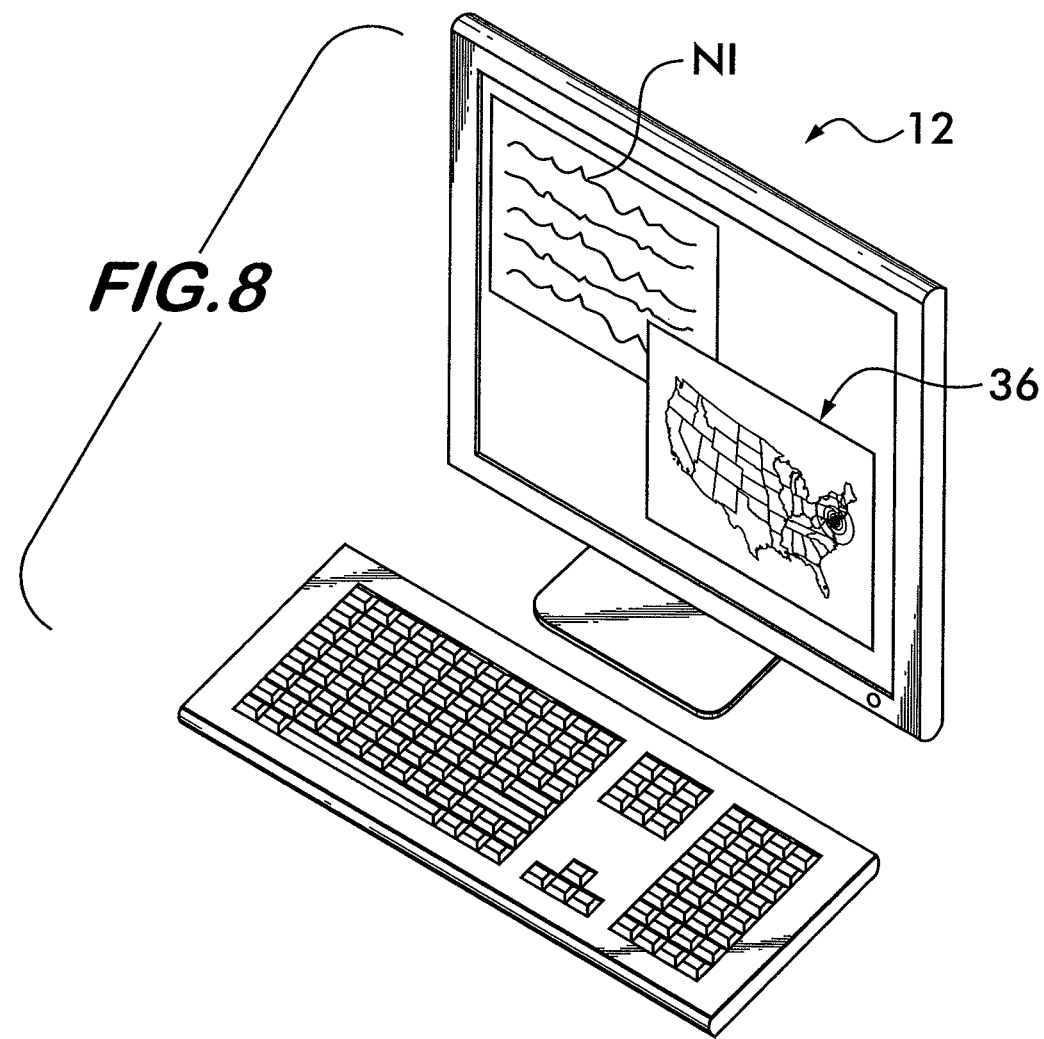
FIG. 8 depicts a work station using the present invention whereby a news item provided to the present invention is displayed to the user for his/her review and ranking while at the same time a regional graphic is displayed showing the user the interest ranking for that news item.

FIG. 7 depicts an exemplary country, e.g., the United States, whereby 3 distinct news items have been processed through the GES and the corresponding ranking algorithm displays respective graphics 11, 13 and 15 for the instantaneous interest in these distinct news items. FIG. 8 depicts a work station 12 using the present invention whereby a news item 11 provided to the present invention 20 is displayed to the user for his/her review and ranking while at the same time a regional graphic 36 is displayed showing the user how the interest ranking for that news item NI is expanding.

Figure 9:
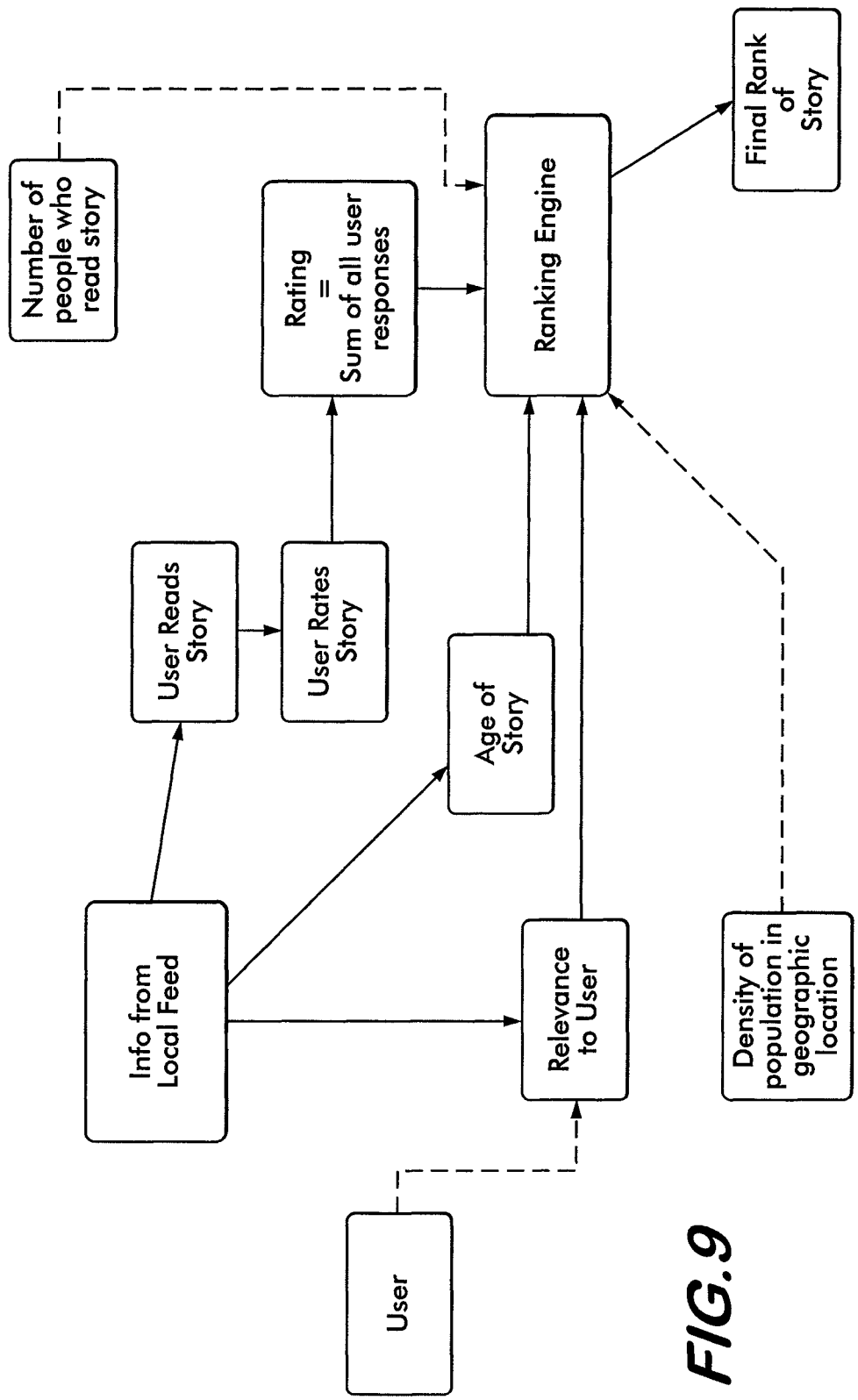
FIG. 9 is a flow diagram of the ranking process for the GES 30.

FIG. 9 is a flow diagram of the ranking process for the GES 30. As mentioned previously, the term "relevance" as used in this Specification refers to a quantity based on how close a piece of information occurred with respect to any user. The "user rating" refers to a quantity indicating how other users responded to a particular piece of information. This may be a direct user input or indirectly derived from user behavior. An example of direct input would be a user scoring a movie 1 star or 4 stars. An example of indirect derivation would be a tracking of whether or not a user clicked the link for an item.

The "rank" is defined as quantity indicating how much interest a piece of information will have to a given user based on combining the relevance, age, and rating of the piece of information. Rank takes into account the geographical distance between different users. For example, the rank of a piece of information for Alice will be affected more by Bob's response than Carol's response if Bob is closer to Alice than Carol. The rank of a piece of information degrades over time.

The purpose of the ranking engine is to determine the relative order between any two pieces of information for a given user. In general, newer information is given a higher rank than older information. Closer information is given a higher rank than information farther away. Information which is rated more highly by local users is given a higher rank than information which is given a lower rating or information that is rated highly by users farther away. These three factors are combined using a convolution process (or some other mathematical method), as discussed below.

Additional inputs to the ranking engine are "number of people who read the story" and "density of the population at the geographic location."

It should be noted that the cone C showing a base B is by way of example only. Although the preferred embodiment has the base B as representing all of the geographical locations of the United States, e.g., every zip code therein, the invention 20 is not limited to that region. In its broadest sense, the base B can be infinite, representing the entire planet, assuming all geographic locations on the planet could be defined or located with unique indicia, thereby associating a corresponding cone for each geographic location on the planet.

Ranking Engine

The result of the article input section is a dataset of "live" articles tagged with geolocation and time data. The term "article" is broadly construed to include any item comprising any one or combination of video, images or text. In addition, the system 20 contains a pool of rating data based on user interaction or input with these articles.

The general purpose of the ranking system is to identify what content will be most successful in capturing a user's attention. In addition to the actual rating of stories by the user and other users, the system 20 may also take into account the history of the user's interactions with the system. This data is used to map an individual user into a complex space along with other users of the system 20. An interest algorithm is then able to take into account the histories of other users adjacent that space. The output is a set of content optimized to most successfully capture the users' attention.

A ranking engine is a process that takes localized articles and user ratings to rank how interesting an article is to a region. It needs access to the geography, article archive, and user rating databases. It runs once an hour to rank all articles that have been posted or updated within the last 30 days. It can run on many servers. Each server can be designated for a specific region to allow concurrency.

Figure 10:
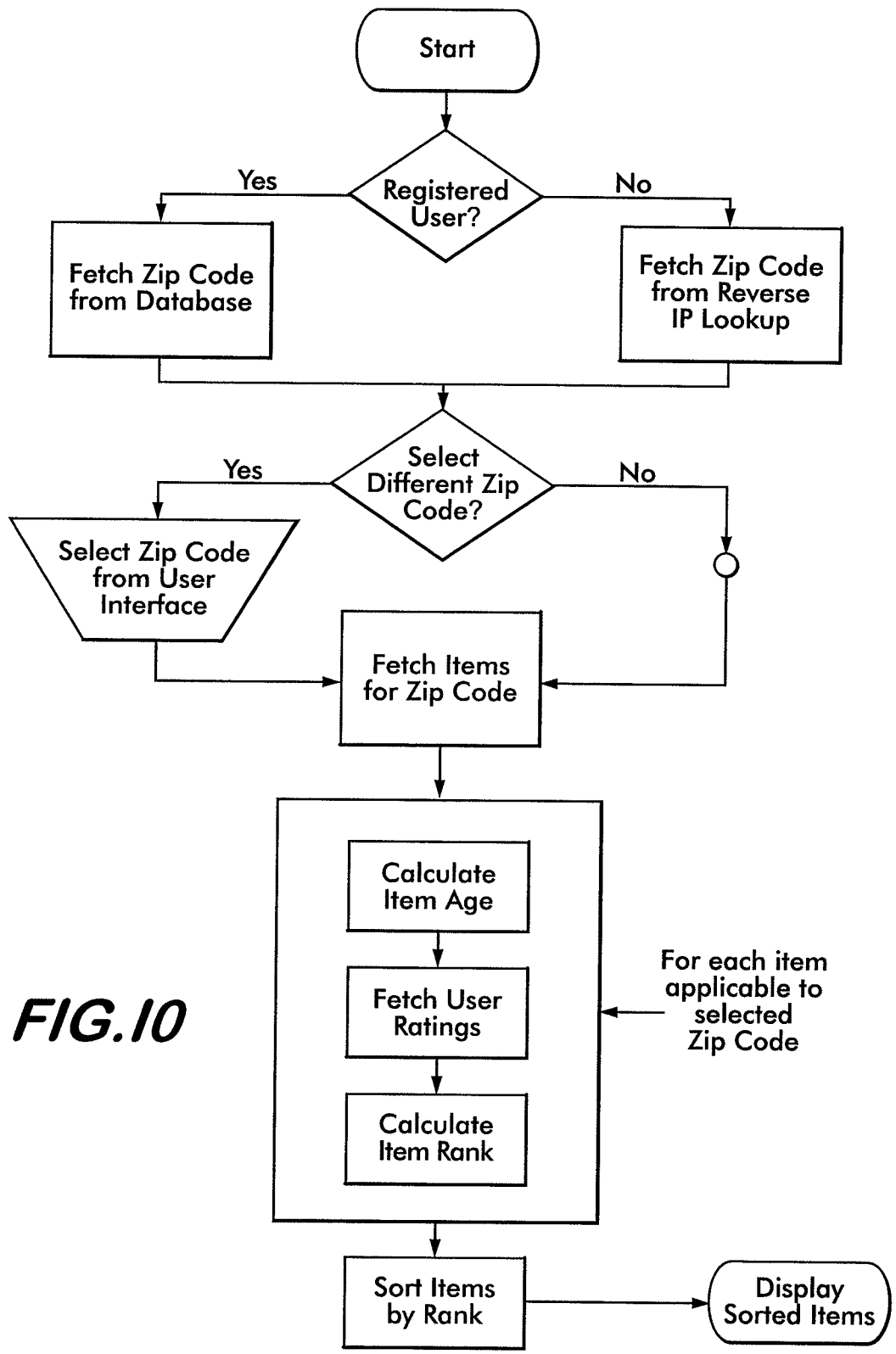
FIG. 10 is another flow diagram of the ranking process for the GES 30.

The ranking engine (see FIG. 10) uses an interest algorithm (discussed below) to map inputs about the user and current available content to come up with a customized selection of content to display for the user. The initial system starts with a simple model. It should be understood that once the present invention 20 is up and running with real users and data, additional models may be tested and optimized to improve user experience.

Figure 10A:
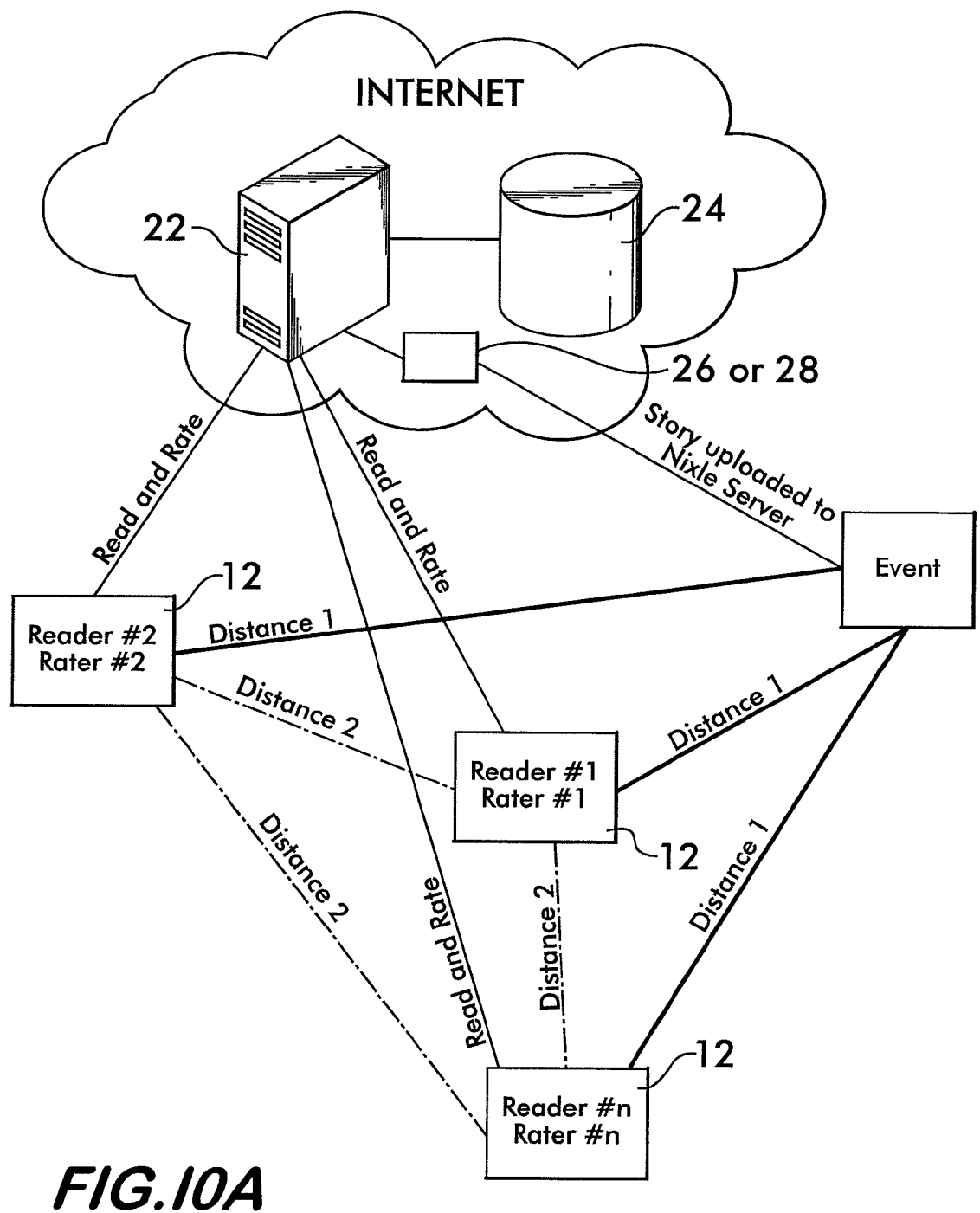
FIG. 10A is a schematic showing the two types of "distances" used in the ranking engine.

As will be discussed later, the interest algorithm involves the terms relevance, user rating, rank and region. These terms are defined as follows:

Relevance: how pertinent an article is to specific Region based on a distance factor and an age factor. The distance factor can be any combination of actual geographical distance, geographical distance as plotted by a population density diffuse algorithm, or distance based on population density in a non-geographical space. The age factor (agefactor1) is based on how old the article is. Relevance is a function of the distance between the article and the reading user (see "Distance1" in FIG. 10A). Thus, articles which occur to close to a first person's community will be more relevant to the first person as compared to a second person who is located, e.g., in the nearest city 10 miles away.

User Rating: an indication by a user of interest in an article. Users simply give a yes vote (or an incremented value, e.g., 1 (low) . . . 5 (high) . . . etc.) to indicate interest (also known as "active voting or rating"). Other factors include such as whether or not a user viewed a given article can also be used as an indication of interest (also known as "passive voting or rating"). It is a function of the distance between the each reader and every rater (see "Distance2" in FIG. 10A). Again, this "distance" can be either a physical distance or a population-corrected distance. The rank for reader n uses all ratings from all previous n−1 raters. Then n's rating is added to the pool and reader n+1's rating is added to the pool. The concept is to take into account the popularity of the article: "if my neighbors believe a given article is important, by rating it highly, then I want to read it also." There is also a separate age factor (agefactor2) for the age of the previous raters' ratings. The overall rating for an article is generated using an "Interest Algorithm".

Rank: a decimal number calculated by relevance and user rating that determines how interesting an article may be to a particular region. Rank determines the display order of articles to a user. For example, the most highly ranked story is displayed first to the user, on down to the lowest ranked article. Rank may be calculated using a heuristic means.

Region: an indicator of the geographical area about which the user is interested in reading news. The region can be defined by any number of geographical inputs including zip code, latitude and longitude, city/state, and street intersection.

Figure 11:
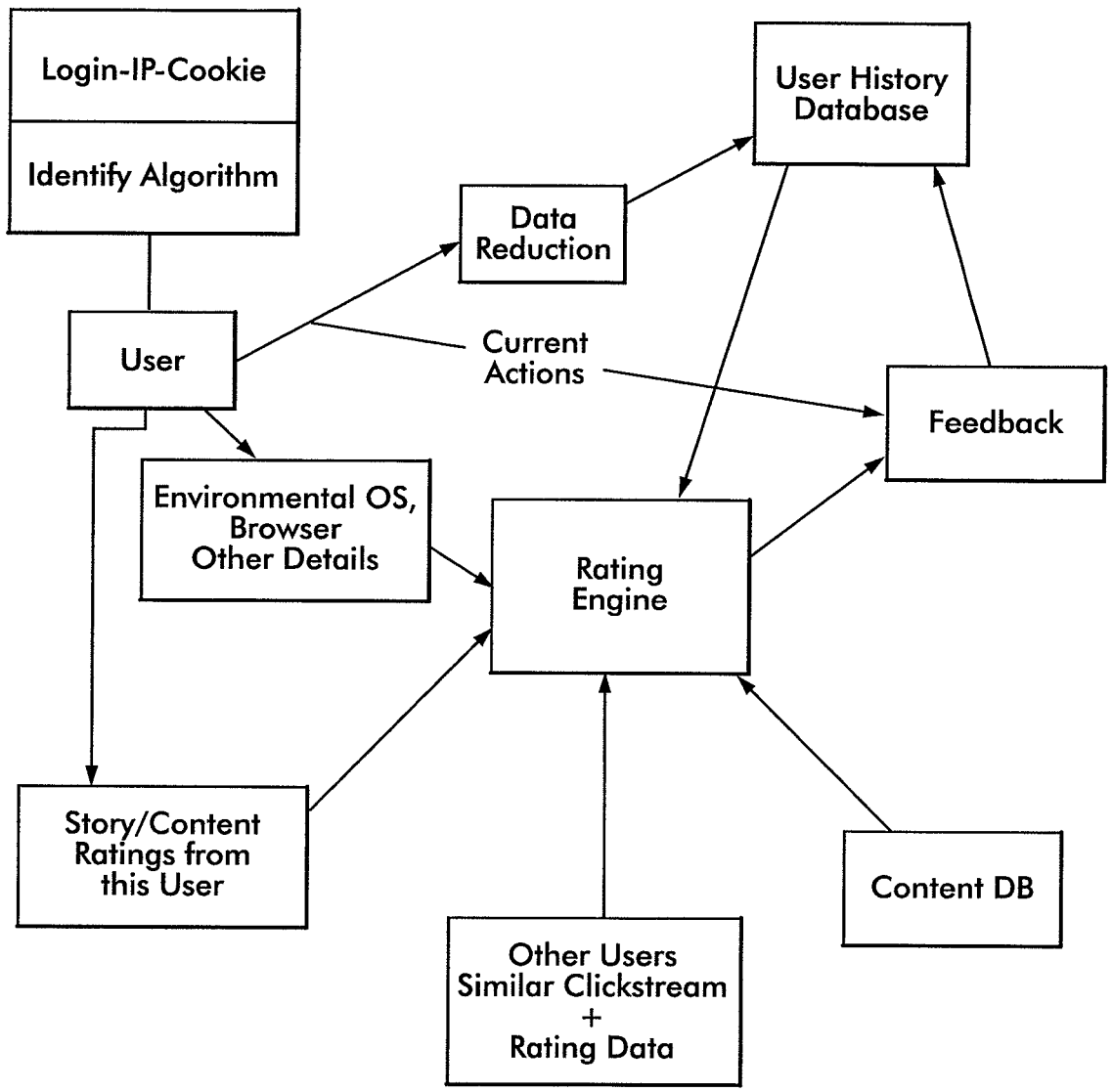
FIG. 11 depicts a block diagram showing inputs to the ratings engine.

FIG. 11 depicts a block diagram showing inputs to the ratings engine. The present invention 20 may record environmental factors about the user, such as day of week, time of day, client software, browser and OS (operating systems) versions and any similar available data available. This data may be used to influence ratings.

The present invention 20 tracks stories that each individual user has rated or tagged. This has two effects on the system 20. The most immediate effect is on that individual user's environment. One example would be marking a story as "inappropriate". Even if the story does not yet have enough people concerned to be pulled from all users, the individual user who so marked it will no longer be able to see the story. The larger effect is that aggregated ratings for stories will be a major input in the interest algorithm.

The present invention 20 also records the users' interactions with the system. The major part of this is their click stream: what stories they read, time between individual clicks, when they proceed offsite, etc. Potentially, this is a very large data set, so part of the process is running the dataset through a proprietary data reduction algorithm to create a dataset that contains information relevant to the ratings model with minimal noise. Development of the data reduction process is tightly coupled to details of the interest algorithm.

In addition to determining what content is displayed to the user, the output of the ratings engine is fed into a feedback engine (see FIG. 11). The actual behavior of the user with the given content is compared to the ratings produced by the ratings engine. The results of this comparison are the primary feedback for tuning the adaptive models used in the ratings engine. In addition, statistical reviews of this feedback are available to system developers to improve the model architecture used by the ratings engine.

Factors Affecting Rank

Distance for both rating and ranking can be expressed using simple geographic distance. Each article when entered into the system has an associated "geographic location" and is typically the location of the event discussed/imaged in the article. By way of example only, if a car accident occurs at the intersection of Main St. and Pine in zip code 90235, the "geographic location" of that article is the zip code 90235. It should be understood that this is by way of example and not limitation and that other types of "geographic location" are also included, such as, but not limited to, communities, townships, longitude/latitude coordinates, etc. Thus, the term "distance" is the physical span between a rater's (one who rates the article) location and the geographic location of the article, or between a rater and a different reader. It can also be expressed using various types of population diffusion maps which distort geography based on population density:

Population Density Distance takes the physical distance between the article's region and the user's region and adjusts it based on population density. The adjustment is so that densely populated areas become larger and sparsely populated areas become smaller. This makes it so that an article travels through populated space rather than empty space to account for the vast distance between large cities. Without this adjustment stories in New York would be unjustly lowly rated in Los Angeles as in the geographical distance mode. Population can be determined by either the actual population for a region or the number of registered users for a population (the active population).

A method for achieving this adjustment is a [Dorling Cartogram](http://www.ncgia.ucsb.edu/projects/Cartogram_Central/types.html) because the regions are circular and sized by population density, rather than geographical boundaries, and maintain relative position to their geographical counterparts.

An alternative method for the adjustments is a [Diffusion Cartogram](http://www.pnas.org/cgi/content/full/101/20/7499). The Diffusion Cartogram maintains relative geographical boundaries and diffuses the population evenly over the area. This type of cartogram more closely resembles the actual geographical area, however this factor isn't important for ranking purposes but may be useful for display purposes.

Another alternative for creating a weight-corrected set of distances between pairs of points in a set is the following:

Given a set of points, P, each associated with a weight, w. In this case P is composed of the set of locations (e.g., latitude and longitude) of zip codes. The weight, w, is the population in each zip code.

To calculate the weight corrected distance between any pair of points in P (p1, p2):

First, calculate the shortest straight line route between p1 and p2. In this case that is the great circle distance—http://en.wikipedia.org/wiki/Great-circle_distance.

Second, break the route between p1 and p2 into N segments. The higher N chosen, the more accurate the calculation is. This gives a set of segments S.

Third, find the centerpoint of each segment in S, given the set of centerpoints C.

For each centerpoint c in C find the closest three points in P(pa, pb, pc) such that pa, pb and pc form a triangle containing c.

Calculate the distances c to pa, c to pb, c to pc. In this case, given the density of zip codes, the great circle distances are ignored and the distance is calculated using the Pythagorean theorem. This yields distances $d_{c\ to\ pa}$, $d_{c\ to\ pb}$, $d_{c\ to\ pc}$.

Using the weights (populations) for pa, pb and pc, calculate the sum $d_{c\ to\ pa}*w_{pa}+d_{c\ to\ pb}*w_{pb}+d_{c\ to\ pc}*w_{pc}$.

This gives a set of sums for each segment in the route p1 to p2. The sum of those values is the weighted distance between p1 and p2.

Article "relevance" is expressed as a function of both article age and distance (Relevance=f(distance)*g(age)). Candidate functions for f and g may be linear, sigmoid or any other function which has a negative slope.

The interest algorithm combines the distance between a rater and a reader and the age of the particular rating to generate a value for that particular rating. The overall rating for a given article in a reader's location is the sum of all ratings for that reader's home location. For example, a first person, known as a "rater" previously requested an article from the present invention 20, read it, and either actively or passively rated or voted on the article. At a later time, a second person known as a "reader" then requests the same article which is presented to him/her with an updated list of ranked stories from the present invention 20. The effect that the first person (i.e., the rater) has on the rank of the article for the second person (i.e., the reader) is a function of the distance between the first person and the second person. It is also a function of how long ago the first person rated the article. As mentioned previously, it should be noted that the term "distance" can be either a physical distance, or a population-corrected distance.

As with relevance there are many functions which can be used to combine age and distance to come up with a rating value. One possibility is:

Select a value n such that n−1 is a small positive fraction. The exact value of n selected decides how much bias is in the system toward local ratings. The value of n typically is then tuned based on the real world performance of the rating engine with a large user base. Thus, for a rating user at population density distance D from the reading:

Unaged Rating=Raw Rating/$D^n$

The unaged rating can be aged using a sigmoid function.

AgedRating=UnagedRating*(1−(1/(1+$e^{(24-AgeInHours)}$)))

These particular functions have the following desirable effects:

a) Because n is slightly>1 ratings have a small positive bias toward local results.

b) Because D is expressed in population density large numbers of ratings coming from large cities won't overly bias the results.

c) The sigmoid function results in an AgedRating value that is high for the first 24 hours and then rapidly declines toward 0.

Ranking combines rating and relevance (e.g., Rank=f(rating, relevance)). The function f could be a simple average or any number of other functions. There could even be a heuristic which guarantees that some articles highly ranked in any set have high ratings and some have high relevance.

The present invention 20 uses the following database table layout to handle rating and ranking data. This takes advantage of the fact that there are a fixed number of regions to deal with in order to pre-calculate and cache all inter-region distances. This facilitates calculating rating and rank significantly more efficient for population density cartograms.

```
City
    id
    name
State
    id
    name
Region
    id
    postal_code
    name
    state_id
    city_id
    longitude
    latitude
    population
    density_latitude #Latitude in population space
    density_longitude #Longitude in population space
    timezone
    daylight_savings
RegionDistance
    from_region_id
    to_region_id
    distance
    density_distance #Distance in population space
# News feed sources. This does not contain information on how to
crawl it, just the basic info to identify it
Feed
    id
    name
    uri
    created
    updated
# Ties a feed to a region, many to many
Feed_Region
    feed_id
    region_id
Article
    id
    feed_id
    region_id
    uri
    headline
    summary
    created
    updated
    last_rating
    is_national ENUM(ratings, admin) # Did it become national by
ratings or admin setting?
ArticleMedia
    id
    article_id
    created
    updated
    type ENUM(text, image, video)
    uri # Image or video URL
    content # Text content or image/video description
```

Rating Calculation
The following SQL function calculates rating:

```
# Get the total rating for an article taking in account user distance and
age falloff
    # This is the sum of all ratings under 30 days old using this formula:
    # (1 / distance) * ((30 – rating_age_in_days) / 30)
```

-continued

```
# The goal is to get a number between 1 and 0
    SELECT SUM( (1 / RegionDistance.density_distance) *
((30 – ((UNIX_TIMESTAMP( ) –
UNIX_TIMESTAMP(ArticleRating.created)) / 86400)) / 30) )
AS overall_rating
    FROM ArticleRating, RegionDistance
    WHERE
        ArticleRating.article_id = Article.id AND
        ArticleRating.created >
        DATE_SUB(CURDATE( ),INTERVAL 30 DAY) AND
        (RegionDistance.from_region_id = $user_region_id AND
RegionDistance.to_region_id = ArticleRating.region_id)
```

Rank Calculation

```
# Once the rating (via sub-select) is obtained, rank can be calculated
# Articles with the same rank (possible) are then sorted by newest first
    # The effect should be similar to the rating algorithm, age falloff as
    sigmoid
    SELECT (1 / RegionDistance.density_distance) *
((30 – ((UNIX_TIMESTAMP ( ) –
UNIX_TIMESTAMP(Article.created)) / 86400)) / 30) * overall_rating
AS rank
    FROM Article, RegionDistance
    WHERE
        (RegionDistance.from_region_id = $user_region_id AND
RegionDistance.to_region_id = Article.id) AND
        Article.id = $article_id
```

Interest Algorithm

The interest algorithm is a proposed solution to the problem of building a location-aware recommender algorithm. It is intended to be used as part of a web application that serves as a portal for information pertaining to a user's local area or neighborhood. The interest algorithm's primary application is to filter online articles so that only articles that are relevant to a user's geographical location are recommended.

The web service maintains a database containing a set of users $U=\{u_1 \ldots u_m\}$ and a set of articles $A=\{a_1, \ldots a_m\}$. A user $u_i$ has a known location $1(u_i)=[x_{ui}, y_{ui}]^T$, in the "real world," indicated by zip code or geographical coordinates. The service also maintains a $|U| \times |A|$ matrix of ratings, where rating $r_{ij}>0$ represents the opinion of user $u_i$ about article $a_j$. If the user has not rated that article, $r_{ij}=0$ by definition.

The predicted level of interest $p(u_i, a_j)$ in article $a_j$ by user $u_i$ is computed by taking the mean ratings of $a_j$ weighted by the similarity between $u_i$ and the rater:

$$p(u_i, a_j) = \frac{\sum_{k \in U-\{u_i\}} r_{kj} s(u_i, u_k)}{\sum_{k \in U-\{u_i\}} s(u_i, u_k)}$$

where the similarity between users $s(u_i, u_k)$, is a function of the distance between them:

$$s(u_i, u_k) = (1 + \sqrt{[l(u_i) - l(u_k)]^T [l(u_i) - l(u_k)]})^{-1}$$

The web service calculates $p(u_i, a_j)$ for all relevant articles, then sorts them and recommends only the more relevant ones to the user.

Newly posted articles will naturally have few ratings, and so will only be recommended to users geographically close to the initial raters. However, as more and more of these users add their own ratings, it is expected that the area of high interest will grow. While not explicitly part of the definition of the algorithm, this social effect is an important component of how the interest algorithm attempts to model more informal word-of-mouth phenomena.

The home page (FIG. 12) of the present invention 20 displays the current top local and national news for the reader's initial location. The home page also provides a simple search mechanism.

The following is a summary of an anonymous view of the home page of the present invention 20:

| Step | Action |
| --- | --- |
| 1 | Anonymous user arrives on home page. |
| 2 | System will perform a reverse IP address lookup on the User's IP address to determine a location. |
| Result | Resulting location will be the user's default location for the home page's local news. |

The following is a summary of a search using the home page of the present invention 20:

| Step | Action |
| --- | --- |
| 1 | User enters search term(s) into search text entry box. |
| 2 | User initiates search. by either:<br>a) Clicking "Search" button<br>b) Hitting the <Enter> key with focus on the search text entry box. |
| Result | User is taken to search results page (section 1.2) |

The following is a summary of a viewing process by the user using the home page of the present invention 20:

| Step | Action |
| --- | --- |
| 1 | User visits home page and clicks the heading of an article. |
| Result | User is taken to article's page. |

The following is a summary of a "Change Location link" which allows the user to change the location for which he/she is viewing news.

| Step | Action |
| --- | --- |
| 1 | User clicks the Change Location link. |
| Result | User is taken to location page. |

The search results page (FIG. 13) of the present invention permits the user to see and navigate the results of his/her search.

The following is a summary of the navigation process to a search result:

| Step | Action |
| --- | --- |
| 1 | User clicks the title of an article they want to view. |
| Result | User is taken to article's page. |

The following is a summary of the process for changing search terms:

| Step | Action |
| --- | --- |
| 1 | User changes the text in the search text box. |
| 2 | User initiates the search by either: |

| Step | Action |
| --- | --- |
| | a) Click the "Search" button, or<br>b) Pressing the <Enter> key while the cursor is in the search text entry box. |
| Result | Search results page is refreshed with results pertaining to new term. |

The following is a summary for navigating to different page in the results:

| Step | Action |
| --- | --- |
| 1 | User clicks "Next" "Previous" or an ordinal page link. |
| Result | Search results page is refreshed with results at certain offset determined by page selection. |

The following is a summary for navigating to an advanced search page:

| Step | Action |
| --- | --- |
| 1 | User selects the link to the Advanced Search page |
| Result | User is taken to the Advanced Search page |

FIG. 14 depicts the advanced search page of the present invention 20. The following is a summary for performing an advanced search using the present invention:

| Step | Action |
| --- | --- |
| 1 | User enters search text and/or selects one or more search criteria |
| 2 | User initiates search by clicking the "Search" button |
| Result | User is taken to the search results page with all articles found for the selected criteria |

Figure 15A:
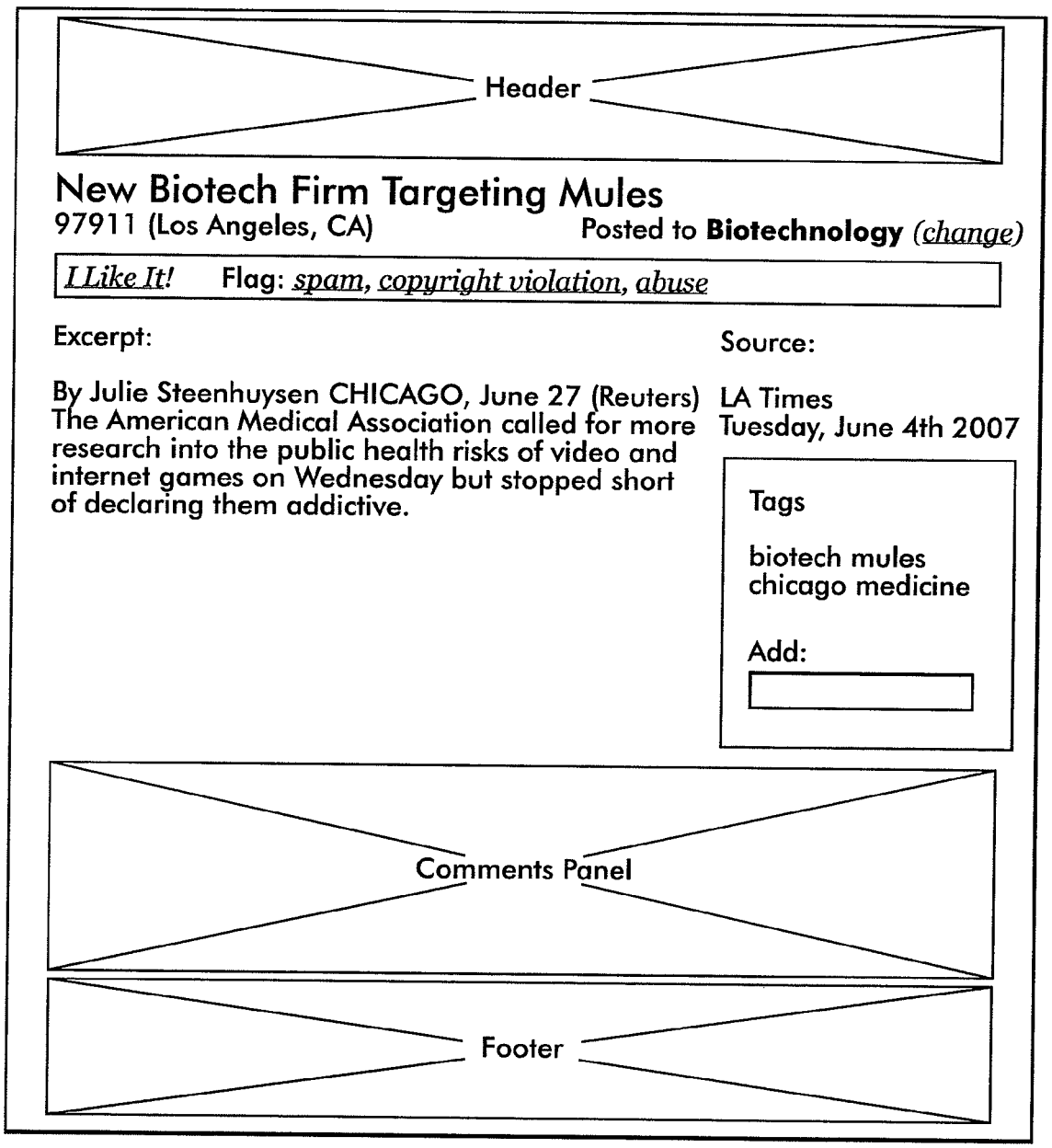
FIG. 15A is a display screen for an exemplary news article that has been aggregated from a professional local news source.
Figure 15B:
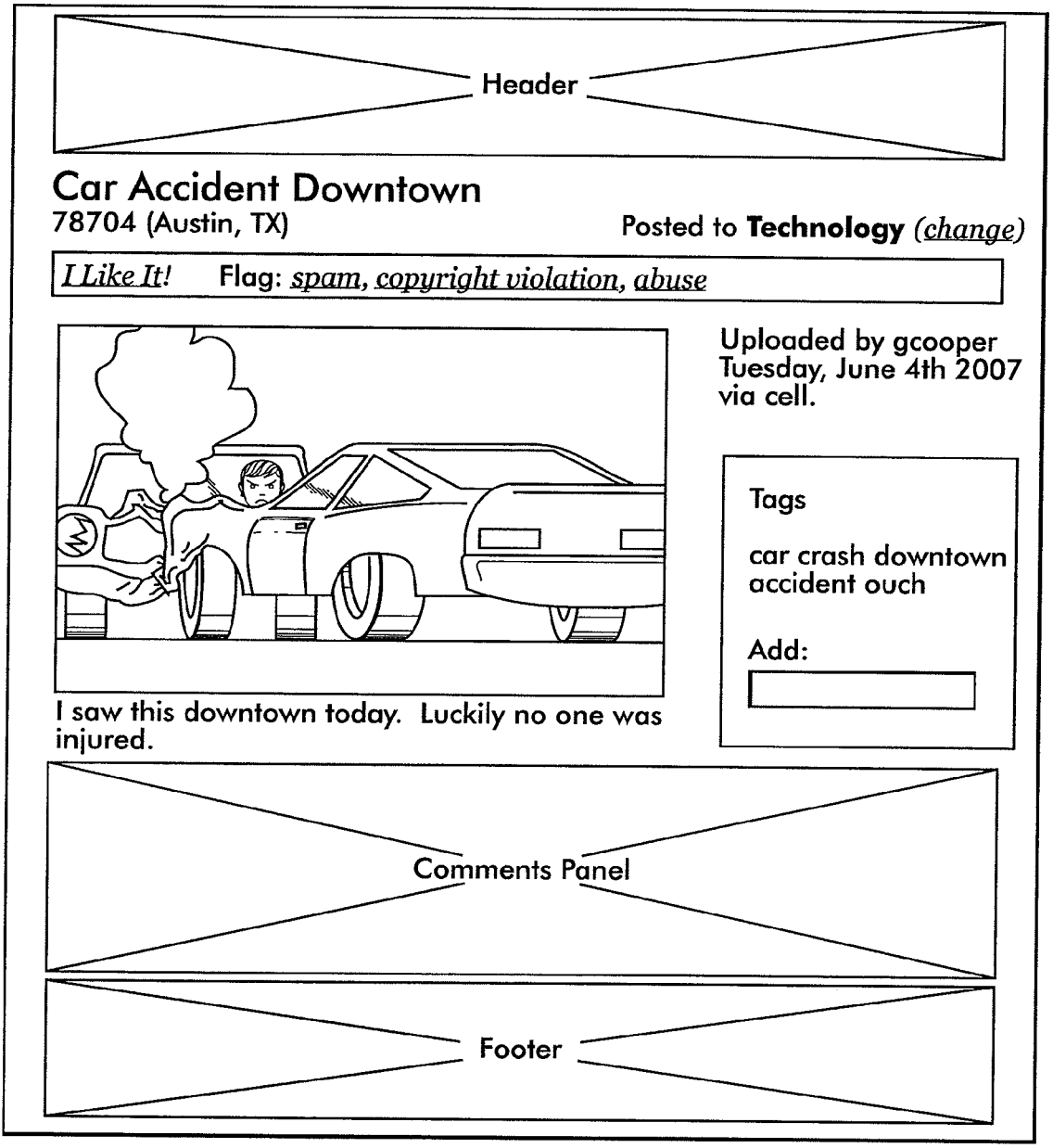
FIG. 15B is a display screen for an exemplary image that has been uploaded by a user to the present invention.
Figure 15C:
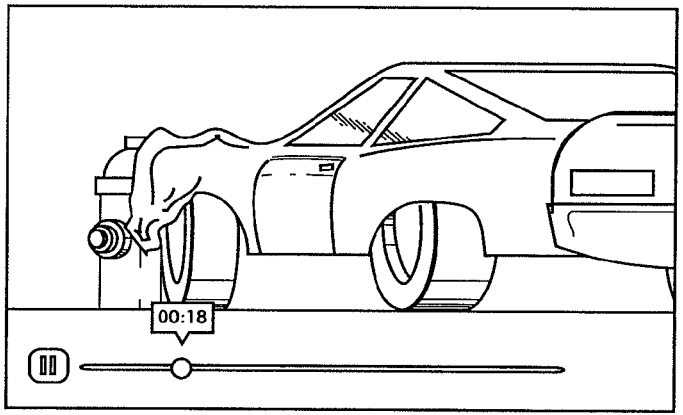
FIG. 15C is a display screen for an exemplary video that has been uploaded by a user to the present invention.

FIGS. 15A-15E provide exemplary display screens for various types of articles that can be uploaded and/or reviewed by users and which contain article-centric information. FIG. 15A shows a display screen for a news article that has been aggregated from a professional local news source. FIG. 15B shows a display screen for an image that has been uploaded by a user. FIG. 15C shows a display screen for a video that has been uploaded by a user. FIG. 15D shows a display screen for a video article and which includes accompanying text. FIG. 15E shows a display screen for a text-only article.

The following provides a summary of viewing a complete article using the present invention 20:

| Step | Action |
| --- | --- |
| 1 | User clicks the title of an article they want to view. |
| Result | User is taken to article's page. |

The following provides a summary of how the user indicates that he/she likes the article using the present invention 20:

| Step | Action |
| --- | --- |
| 1 | User clicks the "I like it!" link for an article |
| Result | The article has its user rating increased by one |

It should be noted that where the user wishes to indicate that he/she did not like the article, a provision (not shown) is made in the same display screen to accommodate such a negative rating function.

The following provides a summary of how the user indicates that he/she believes that the article is inappropriate using the present invention 20:

| Step | Action |
|------|--------|
| 1 | User clicks the "Flag as abuse" link for an article |
| 2 | The article is removed from the user's view but not from the view of other users |
| 3 | The inappropriate flag count for the article is increased by one |
| Result | If the inappropriate count reaches a pre-determined threshold, the article is removed from the public display area for all users and is placed in a queue for review by an administrator. |

The following provides a summary of how the user, using the present invention 20, indicates that he/she believes the article may violate copyright:

| Step | Action |
|------|--------|
| 1 | User clicks the "Flag copyright violation" link for an article |
| Result | The user is taken to the copyright violation (aka DMCA violation) page where they can enter pertinent data. See section 1.18. |

The following provides a summary of how a user, using the present invention 20, indicates that he/she believes that the article is spam:

| Step | Action |
|------|--------|
| 1 | User clicks the "Flag as spam" link for an article |
| 2 | The article is removed from the user's view but not from the view of other users |
| 3 | The spam flag count for the article is increased by one |
| Result | If the spam count reaches a pre-determined threshold, the article is removed from the public display area for all users and is placed in a queue for review by an administrator. |

The following provides a summary of how the user posts comments about an article using the present invention 20:

| Step | Action |
|------|--------|
| 1 | User enters text in the "Add Comment" area |
| 2 | User clicks the "Save" button. |
| Result | The comment is added to the collection of comments about the article |

National News Flagging

When a user views an item, they have the option of flagging that item as a breaking national news article. Once the item is flagged for national news status it will be placed in a queue for review by an administrator.

Figure 16:
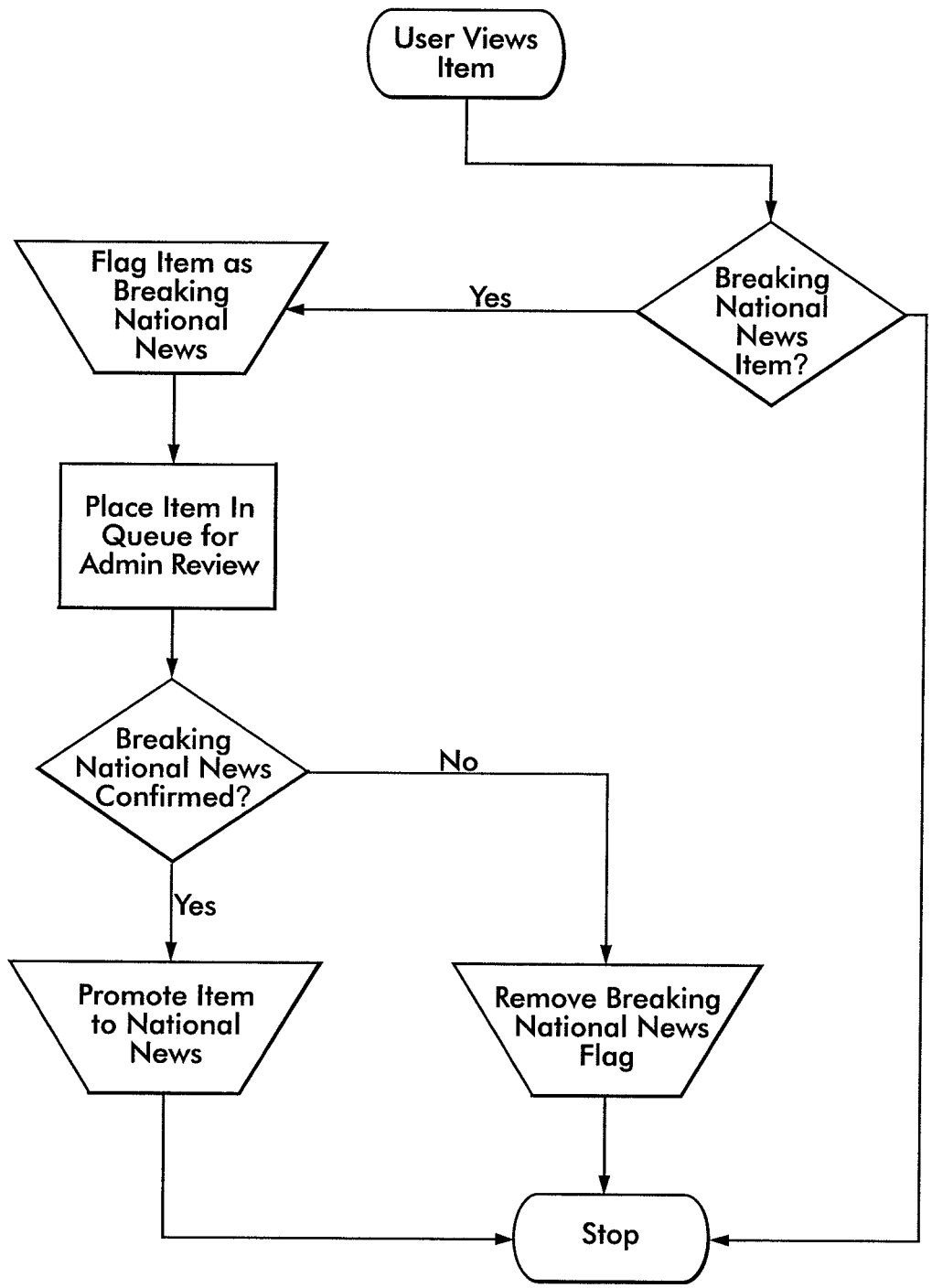
FIG. 16 is a flow diagram for setting a flag for a "breaking national news item.

If the administrator confirms that the flagged item is breaking news and of national interest, it will immediately be promoted to the nationwide coverage area. If the item is not a breaking news event of national interest, the breaking national news flag will be removed. FIG. 16 provides a flow diagram of this function.

Track Inappropriate Items:

When a user views an item, they have the option of flagging that item as inappropriate if they feel it does not belong on the site. Any item flagged as inappropriate by a user will no longer be displayed for that user even if it is still available to other users.

Figure 17:
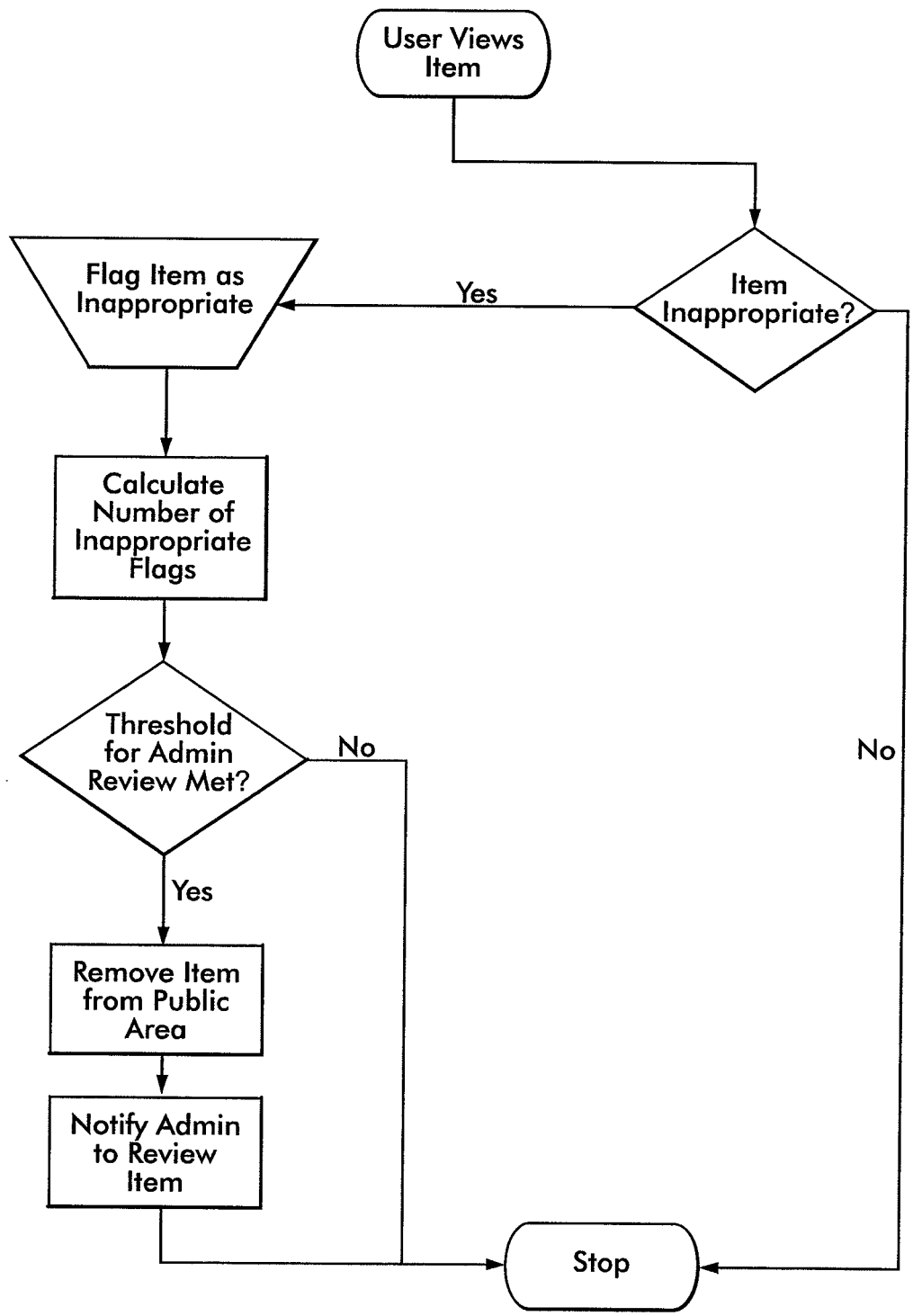
FIG. 17 is a flow diagram of the tracking inappropriate item content.

When an item is flagged as inappropriate, the system determines how many other users have also flagged the item as inappropriate and if the number exceeds a predetermined threshold value, the item will be removed from the public area of the site and placed in a queue for review by an administrator. In this case, email will be sent to the administrator notifying them that an item has been placed in the holding queue pending their review. Upon review, the administrator may remove the item from the site if he/she deems it inappropriate or re-flag as appropriate and return to the public area of the site if he/she does not find the content inappropriate. FIG. 17 provides a flow diagram of this function.

Flag Copyright Violation

When a user views an item, they have the option of flagging that item as being in violation of a copyright. Once the item is flagged for a copyright violation it will be placed in a queue for review by an administrator. The item will still be available for display on the site pending the administrative review, but will be marked as potentially being in violation of one or more copyrights.

Figure 18:
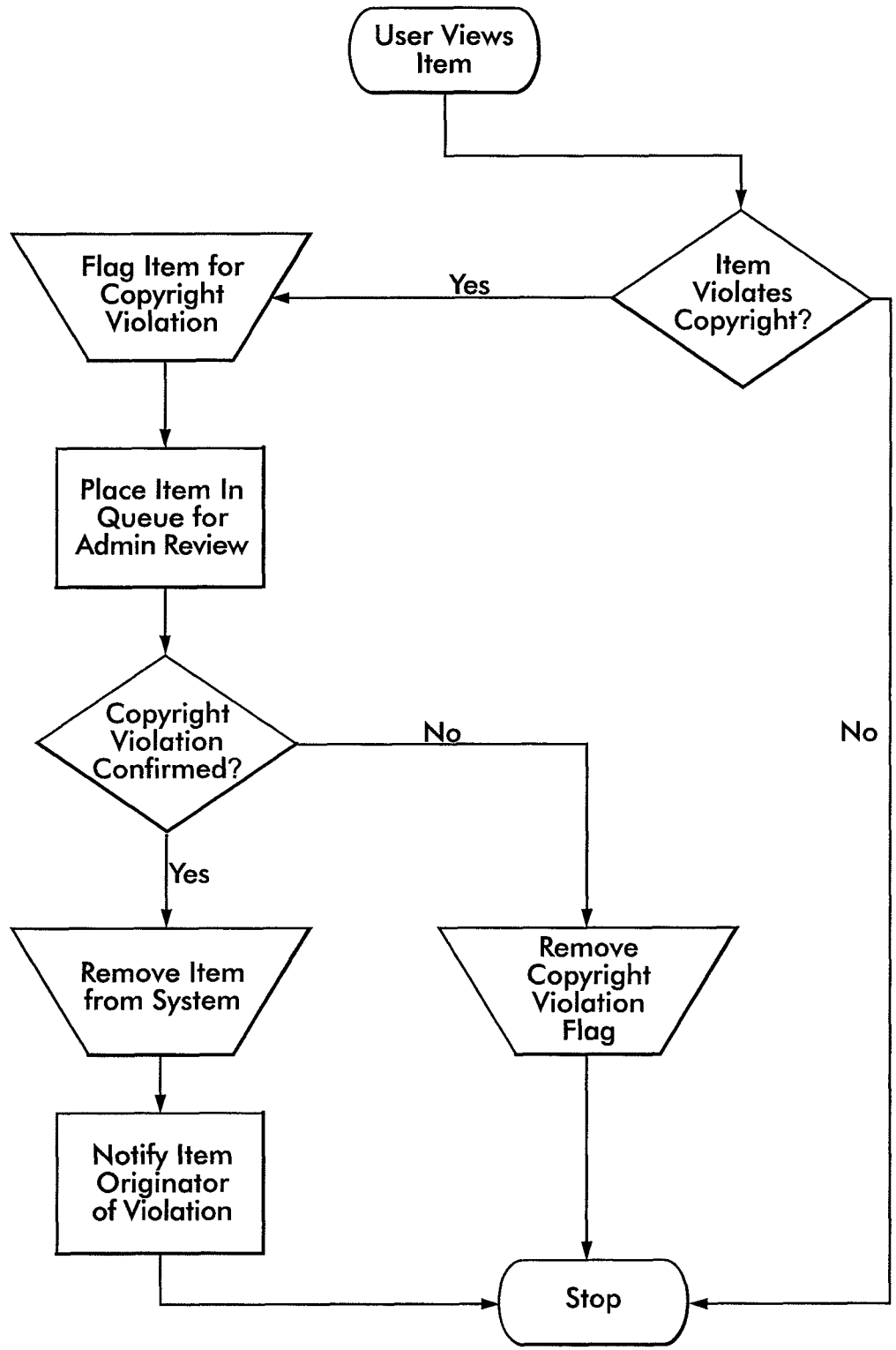
FIG. 18 is a flow diagram for setting a flag for a copyright violation.

After reviewing the flagged item, the administrator may either confirm that the item violates one or more copyrights or that it is not in violation of a copyright. If the item is found to be in violation of one or more copyrights, it will be removed from the system and an email notification will be sent to the originator of the item to inform them of the copyright violation. If the item is not found to violate any copyrights, the copyright violation flag will be removed. FIG. 18 provides a flow diagram of this function.

It should be understood that the broadest definition of "geographic location" is meant to be covered in this application. Thus, terms such as zip code, township, etc., (which have definite meanings in the United States) represent examples of geographic locations in the United States. However, it is within the broadest scope of this application that the term "geographic location" is also meant to cover terms used in any other country in the world for delineating one location from the next.

While the invention has been described in detail and with reference to specific examples thereof, it will be apparent to one skilled in the art that various changes and modifications can be made therein without departing from the spirit and scope thereof.

What is claimed is:

1. A method for permitting news content specific to a geographic location to be rated by users in the geographic location and by users in other geographic locations concentrically located from the geographic location, for providing the most relevant news content in an ordered rank to the users in the geographic location and in the other geographic locations, the method comprising:

(a) providing news content from national news feeds, web file uploads or mobile devices;

(b) determining that the news content pertains to the geographic location from the news content itself or from information associated with the news content;

(c) assigning the news content to at least one server associated with the geographic location based on the determining performed in step (b);

(d) making the news content available to users in the geographic location over global computer networks;

(e) permitting the users in the geographic location to rate the news content using computers to form first user responses;

(f) providing the first user responses to a ranking engine, the ranking engine weighting the first user responses based on time parameters and the geographical distances between the users in the geographic location and the news content, for determining a first level rank for the news content based on the weighted first user responses;

(g) repeating steps (e) and (f) to modify the first level rank to form a revised first level rank, the revised first level rank being used to determine whether to automatically display the news content more prominently to the users in the geographic location;

(h) permitting users in the other geographic locations to experience the news content and to rate the news content to form second user responses;

(i) providing the second user responses to the ranking engine, the ranking engine weighting the second user responses based on time parameters and the geographical distances between the users in the other geographic locations and the news content, for determining a second level rank based on said weighted second user responses;

(j) repeating steps (h) and (i) to modify the second level rank to form a revised second level rank, the revised second level rank being used to determine whether to automatically display the news content more prominently to the users in the other geographic locations than news content that is pertinent only to the other geographic locations.

2. The method of claim 1 wherein the time parameters include the age of the news content.

3. The method of claim 1 wherein the time parameters include the age of the rating of each user.

4. The method of claim 1 wherein the ranking engine also utilizes the geographic distances between the users in the geographic location in forming said weighted first user responses and the geographic distances between the users in the other geographic locations in forming the weighted second user responses.

5. The method of claim 2 wherein the ranking engine utilizes a population density distance in determining the weighted first user responses and the weighted second user responses, the population density distance being the geographic distance between a user and the news content and adjusted based on population density.

6. The method of claim 1 wherein the geographic location is a zip code and wherein the other geographic locations are surrounding zip code areas.

7. The method of claim 1 wherein the step of making the news content available to the users in the geographic location comprises providing a web portal that displays the news content for the users to experience.

8. An interactive system for permitting news content pertaining to a geographic location to be rated by users in the geographic location and by users in other geographic locations concentrically located from the geographic location, for displaying the most relevant news content, in an ordered rank, to the users in the geographic location and the users in the other geographic locations, the interactive system comprising:

a first exchange for receiving news content from an aggregator feed of Internet news content;

a second exchange for receiving news content from mobile devices or web browsers;

a database coupled to the first and second exchanges, the database comprising a localizer that determines that the news content pertains to the geographic location from the news content itself or from information associated with the news content;

an interactive Internet application, coupled to the database, through which the users in the geographic location can experience the news content and rate the news content to form first user responses, the Internet application comprising a ranking engine for determining a first level rank for the news content from the first user responses by weighting the first user responses based on time parameters and the geographic distances between the users in the geographic location and the news content, the first level rank determining whether the news content should be automatically displayed more prominently to the users in the geographic location; and wherein the users in the other geographic locations can also experience the news content and rate the news content to form second user responses, the second user responses being weighted by the ranking engine based on time parameters and the geographic distances between the users in the other geographic locations and the news content to form a second level rank based on the weighted second user responses, the second level rank being used to display the news content in the other geographic locations based on second level rank, the second level rank determining whether the news content should be automatically displayed more prominently to the users in the other geographic locations than news content that is pertinent only to the other geographic locations.

9. The system of claim 8 wherein the time parameters include the age of the news content.

10. The system of claim 8 wherein the time parameters include the age of the rating of each user.

11. The system of claim 8 wherein the ranking engine also utilizes the geographic distances between the users in the geographic location in forming the weighted first user responses and the geographic distances between the users in the other geographic locations in forming the weighted second user responses.

12. The system of claim 8 wherein the ranking engine utilizes a population density distance in determining the weighted first user responses and the weighted second user responses, the population density distance being the geographic distance between a user and the news content and adjusted based on population density.

13. The system of claim 8 wherein the geographic location is a zip code and wherein the other geographic locations are surrounding zip code areas.

* * * * *